(12) United States Patent
Gordon et al.

(10) Patent No.: US 7,171,655 B2
(45) Date of Patent: *Jan. 30, 2007

(54) VERIFIER TO CHECK INTERMEDIATE LANGUAGE

(75) Inventors: Andrew Gordon, Cambridge (GB); Donald Syme, Cambridge (GB); Jonathon Forbes, Bellevue, WA (US); Vance P. Morrison, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 511 days.

This patent is subject to a terminal disclaimer.

(21) Appl. No.: 10/370,359

(22) Filed: Feb. 19, 2003

(65) Prior Publication Data
US 2003/0154468 A1 Aug. 14, 2003

Related U.S. Application Data

(63) Continuation of application No. 09/388,176, filed on Sep. 1, 1999, now Pat. No. 6,560,774.

(51) Int. Cl.
*G06F 9/45* (2006.01)
*G06F 9/44* (2006.01)
*G06F 13/00* (2006.01)

(52) U.S. Cl. .............. 717/146; 717/114; 717/118; 717/141; 717/148; 719/316

(58) Field of Classification Search .................. None
See application file for complete search history.

(56) References Cited

U.S. PATENT DOCUMENTS

| | | | |
|---|---|---|---|
| RE33,706 E | 10/1991 | Mohri | |
| 5,280,617 A | 1/1994 | Brender et al. | |
| 5,659,753 A | 8/1997 | Murphy | |
| 5,668,999 A | 9/1997 | Gosling | |
| 5,740,441 A | 4/1998 | Yellin et al. | |
| 5,748,964 A | 5/1998 | Gosling | |
| 5,836,014 A | 11/1998 | Faiman, Jr. | |
| 5,905,895 A * | 5/1999 | Halter | 717/139 |
| 5,999,731 A | 12/1999 | Yellin et al. | |
| 6,075,940 A | 6/2000 | Gosling | |
| 6,092,147 A | 7/2000 | Levy et al. | |
| 6,233,733 B1 * | 5/2001 | Ghosh | 717/118 |
| 6,247,174 B1 | 6/2001 | Santhanam et al. | |
| 6,308,317 B1 * | 10/2001 | Wilkinson et al. | 717/139 |
| 6,704,923 B1 * | 3/2004 | Gosling | 717/126 |

OTHER PUBLICATIONS

Gosling-McGilton, The JAVA Language Environment: Contents, White Paper, May 1996, http://java.sun.com/docs/white/langenv/.*
Thorn, "Programming Languages for Mobile Code," *ACM Computing Surveys*, vol. 29, No. 3, Sep. 1997.
Rémy et al., "Objective Caml—A general purpose high-level programming language," *ERCIM News* No. 36, available at http://caml.inria.fr/ercim.html [accessed Jun. 1, 1999].

(Continued)

*Primary Examiner*—Antony Nguyen-Ba
(74) *Attorney, Agent, or Firm*—Microsoft Corporation

(57) ABSTRACT

Verification of intermediate language code. In one embodiment, a computer-implemented method first verifies metadata of an intermediate language code for consistency and accuracy, and then verifying the intermediate language code for consistency and accuracy. This latter part in one embodiment is accomplished by performing first a syntactic check of the intermediate language code, and then a semantic check of the intermediate language code.

20 Claims, 31 Drawing Sheets

OTHER PUBLICATIONS

Rouaix, "A Web Navigator with applets in Caml," *Computer Networks and ISDN Systems*, vol. 28, Nos. 7-11, Proceedings of the Fifth International World Wide Web Conference, Paris, France, May 6-10, 1996.

"Cmm and Java Compared: A comparison of modern languages for the internet and WorldWide Web," published Apr. 1997, available at http://www.nombas.com/us/otherdoc/javavcmm.htm [accessed Jul. 12, 1999].

Howard, "Eiffel A Quick Overview," *Journal of Object-Oriented Programming*, vol. 5, No. 8, Jan. 1993.

Schoenefeld, "Object-oriented Design and Programming: An Eiffel, C++, and Java Course for C Programmers," University of Tulsa, Tulsa, OK, *Proceedings of the twenty-eight SIGCSE Technical Symposium on Computer Science Education*, vol. 29, No. 1, Mar. 1997.

"Web Programming Languages," available at http://www.objs.com/survey/lang.htm [accessed Jul. 12, 1999].

Leroy et al., "Security properties of typed applets," Proceedings of the 25th ACM SIGPLAN-SIGACT Symposium on Principles of Programming Languages, San Diego, CA, Jan. 19-21, 1998.

Necula et al., "Safe Kernel Extensions Without Run-Time Checking," Carnegie Mellon University, Pittsburgh, PA, *Proceedings of the Second Symposium on Operating Systems Design and Implementation*, Seattle, WA, Oct. 28-31, 1996.

Wahbe et al., "Efficient Software-Based Fault Isolation," University of California, Berkeley, CA, *Proceedings of the 14th ACM Symposium on Operating Systems Principles*, 1993.

Necula et al., "Safe, Untrusted Agents using Proof-Carrying Code," Carnegie Mellon University, Pittsburgh, PA, submitted to Lecture Notes in *Computer Science* Special Issue on Mobile Agents, Oct. 1997.

Necula et al., "Proof-Carrying Code," Carnegie Mellon University, Pittsburgh, PA, *Proceedings of the 24th Annual ACM SIGPLAN-SIGACT Symposium on Principles of Programming Languages*, Paris, France, Jan. 15-17, 1997.

Dorwand et al., "Inferno," *Proceedings IEEE COMPCON*, San Jose, CA, Feb. 23-26, 1997.

"A comparison of Inferno and Java," Computing Sciences Research Center of Bell Labs, Murray, NJ White Paper available at http://www.lucent-inferno.com [accessed Jul. 12, 1999].

"Inferno User's Guide." pp. 1-1 through 1-14.

Thorn, "Programming Languages for Mobile Code," *ACM Computing Surveys*, vol. 29, No. 3, Sep. 1997.

Gostling et al., "The Java™ Language Environment," White Paper, Sun Microsystems, Moutain View, CA, May 1996.

Franz et al., "Does Java Have Alternatives," University of California, Irvine, CA, *Proceedings of the Third California Software Symposium* (CCS 1997).

Youmans, "Java: Cornerstone of the Global Network Enterprise," Virginia Tech, Spring 1997.

Ortiz, Jr., "The Battle over Real-Time Java," *Computer*, Jun. 1999. Elements of comparison Java/Hotjava vs. Caml/MMM, available at http://pauillac.inria.fr/~rouaix/mmm/current/javacomp.html [accessed May 28, 1999].

Kramer et al., "The Java™ Platform," Sun Microsystems 1997 available at http://www.javasoft.com/docs/white/platform/javaplatformTOC.doc.html [accessed Jul. 22, 1999]..

Liang et al., "Dynamic Class Loading in the Java™ Virtual Machine," Sun Microsystems, Palo Alto, CA, ACM Sigplan Notices, vol. 33, No. 10, Oct. 1998.

Yelland, "A Compositional Account of the Java™ Virtual Machine," Sun Microsystems, Palo Alto, CA, *Proceedings of the 26th ACM SIGPLAN-SIGACT on Principles of Programming Languages*, 1999.

Goldberg, "A Specification of Java Loading and Bytecode Verification," Kestrell Institute, Palo Alto, CA, *Proceedings of the 5th ACM Conference on Computer and Communications Security*, 1998.

Franz et al., "Introducing Juice," University of California, Irvine, CA, Oct. 30, 1966, available at http://caesar.ics.uci.edu/intro.html [accessed Jul. 7, 1999].

Waddington et al., "Java: Virtual Machine for Virtually Any Platform," *Embedded Systems Programming*, vol. 9, No. 6, Jun. 1966.

Gosling et al., "Java Intermediate Bytecodes," *Proceedings ACM Sigplan Workshop on Intermediate Representations*, San Francisco, CA, Jan. 22, 1995, ACM SIGGPLAN Notices, vol. 30, No. 3, Mar. 1995.

Frascadore, "Java Application Server Security Using Capabilities," *Java™ Report*, Mar. 1999, pp. 31-42.

Zhang, "Secure Code Distribution," *Computer*, vol. 30, Issue 6, Jun. 1997, pp. 76-79.

Hester et al., "Building Flexible and Extensible Web Applications with Lua," *Journal of Universal Computer Science*, vol. 4, No. 9, 1998, pp. 748-762.

Waldo, "Programming with Java," *Unix Review*, May 1996, pp. 31-37.

Harbison, "Modula-3," *BYTE*, vol. 15, No. 12, Nov. 1990, pp. 385-392.

The Modula-3 Programming Language, *Dr. Dobb's Journal*, vol. 19, No. 12, Winter 1994.

Grimm et al., "Access Control for the SPIN Extensible Operating System," University of Washington, Seattle, WA, *IEEE Symposium on Security and Privacy*, 1997, p. 205.

Robinson, "Modula-3 in an undergraduate Computer Science course," *The Second International MODULA-2 Conference*, 'MODULA-2 and BEYOND', Sep. 11, 1991.

Templ, "Oberon vs. C++," The Modula Tor, Oberon-2 and Modula-2 Technical Publication, No. 9, Oct. 1994.

Adl-Tabatabi et al., "Efficient and Language-Independent Mobile Programs," *ACM Sigplan Notices*, vol. 31, No. 5, May 1996.

"Differences Between Phantom and Java," from Internet at http://www.apocalypse.org/pub/u/antony/phantom/javadiffs.htm [accessed Jul. 19, 1999].

Rook, "A Language Collector Comments on: Java, Perl & Python," available at http://www.chips.navy.mil/chips/archives/97 [accessed Jul. 12, 1999].

Masse, "Development Strategies for Better Software: An Analysis of Two Next-Generation Languages: Java and Python," Fifth Python Workshop, Nov. 26, 1996, from Python website http://www.python.org/~masse/papers/java-python96 [accessed Jul. 12, 1999].

"Development Strategies for Better Software," Fifth Python Workshop, Dec. 12, 1996, from Python website http://www.python.org/~masse/papers/java-python96.

Nicolaou, "CS 642 Term Paper: A survey of distributed languages," Python website, May 9, 1996.

Van Rossum, "Grail—The Browser for the Rest Of Us (Draft)," Corporation for National Research Initiatives, Reston, Virginia, May 30, 1996, from Internet.

Van Rossum, "Grail—An Extensible Interface For Browsing The Web And More," Corporation for National Research Initiatives, Reston, Virginia, Nov. 1995.

"Comparison [of Grail] to HotJava," available at http://grail.cnri.reston.va.us/grail/info/java.htm [accessed May 28, 1999].

Gritzalis et al., "Security Issues Surrounding Programming Languages," SIGOPS *Operating Systems Review*, vol. 32, No. 2, Apr. 1998.

Small, "MiSFIT: A Freely Available Tool for Building Safe Extensible Systems," Harvard University, *Technical Report* Jul. 1996, 1996.

Domel, "Interaction of Java and Telescript Agents," *Mobile Object Systems Towards the Programmable Internet, Second International Workshop*, MOS '96, Linz, Austria, Jul. 8-9, 1996.

Tardo et al., "Mobile Agent Security and Telescript," General Magic, Inc., Sunnyvale, CA, *IEEE COMPCON*, 1996.

Gray, "Agent Tcl: A flexible and secure mobile-agent system," thesis for Dartmouth College, Hanover, New Hampshire, Jun. 30, 1997.

Lampson, "A Description of the Cedar Language," Xerox Palo Alto Research Center, Palo Alto, CA, Dec. 1983.

Identification of Reference Chart, BACKHOUSE, *Program Construction and Verification*, Prentice Hall, 1986.

Identification of Reference Chart, Craigen et al, Formal Methods of Trustworthy Computer Systems, Springer-Verlag, 1990.

Girard, "Inferno Promises Multiplatform OS," *Computerworld*, vol. 30, No. 21, May 20, 1996.

Wirth, "From Modula to Oberon," *Computersysteme*, Zurich, Switzerland, Nov. 1990.

Van Rossum, *Python Reference Manual*, v.1.2, Centrum voor Wiskunde en Informatica (CWI), Amsterdam, The Netherlands, Apr. 10, 1995.

Fritzinger et al., "Java™ Security," Sun Microsystems, 1996.

Ousterhout et al., "The Safe-Tcl Security Model," Sun Microsystems, Mountainview, CA, Mar. 26, 1997.

Bernard, "Inferno Security," Lucent Technologies—White Paper, available at Lucent Website, http://www.lucent.com [accessed Aug. 27, 1999].

Winterbottom et al., "The design of the Inferno virtual machine," Bell Labs, Lucent Technologies, available at http://plan9bell-labs.com [accessed Aug. 30, 1999].

Yellin, "The JIT Compiler API," Sun Microsystems, Oct. 4, 1996.

Stamos et al., "Implementing Remote Evaluation," *IEEE Transactions on Software Engineering*, vol. 16, No. 7, Jul. 1990.

Stamos et al., "Remote Evaluation," Massachusetts Institute of Technology, *ACM Transactions on Programming Languages and Systems*, vol. 12, No. 4, pp. 537-565, Oct. 1990.

Deutsch et al., "A Flexible Measurement Tool For Software Systems," University of California, Berkeley, CA, Information Processing 72, North Holland Publishing Company, 1972.

Cousot et al., "Abstract Interpretation: A Unified Lattice Model for Static Analysis of Programs by Construction or Approximation of Fixpoints," 1977, *in Proceedings of the $4^{th}$ POPL*, Los Angeles CA, ACM Press, New York, pp. 238-252.

Naur, "Checking of Operand Types in Algol Compilers," *BIT*, vol. 5, 1965, pp. 151-163.

Aho et al., *Compilers Principles, Techniques, and Tools*, Addison-Wesley Publishing, 1986, Chapter 6, Type Checking, pp. 343-388.

Goodwin, Conditions for Underflow and Overflow of Stack, *The Computer Journal*, vol. 20, No. 1, pp. 56-62, Feb. 1977.

McGraw, G., et al., Securing Java, Section 10, Type Safety, ISBN 047131952X (John Wiley & Sons), Feb. 1, 1999.

Felten, E., "Java Security and Type Safety", Byte Magazine, Jan. 1, 1997.

Laukkanen, Mikko, "Real-time Java—Memory Management", Seminar on Real-time Java, University of Helsinki, Department of Computer Science, date unknown.

White, Derek, et al., "The GC Interface in the $EVM^1$" (SML TR-98-67), Dec. 1998, Sun Microsystem Laboratories, Palo Alto, California, pp. 1-20 available at http://www.sun.com/solaris/java/.

\* cited by examiner

| Flag | Meaning |
|---|---|
| VER_FLAG_UNINIT | This item is uninitialised. If a byref, it means &(uninitialised <value class or local variable>). If not a byref, it means it is an unconstructed object reference – something that can exist only when verifying a constructor method. It is illegal to have an &(uninitialised objref). |
| VER_FLAG_BYREF | The item is a byref |
| VER_FLAG_NULL_OBJREF | The object is the null object reference (thus m_pEEClass does not contain valid data). The component type must be VER_ELEMENT_TYPE_OBJREF. |
| VER_FLAG_ARRAY | The object is an array of some kind (m_pEEClass provides the general array type, and m_pUnderlyingArrayClass provides the specific type of the array component). The component type must be VER_ELEMENT_TYPE_OBJREF. |
| VER_FLAG_BYREF_LOCAL | This is the address of a local variable. The local variable number is stored in the upper 16 bits of m_dwFlags. VER_FLAG_BYREF must also be set, and this flag is mutually exclusive with VER_FLAG_BYREF_INSTANCE_FIELD. |
| VER_FLAG_THIS_PTR | This is used only when verifying constructor methods, where the "this" pointer can be uninitialised. This is so that when the "this" pointer is initialised by calling a constructor, all places where "this" is located (e.g. local variables and other stack locations) can simultaneously be initialised. |
| VER_FLAG_BYREF_INSTANCE_FIELD | This is the address of an instance field of the class of current method. The instance field number is stored in the upper 16 bits of m_dwFlags. This is used only when verifying value class constructors. VER_FLAG_BYREF must also be set, and this flag is mutually exclusive with VER_FLAG_BYREF_LOCAL. |
| VER_FLAG_BYREF_PERMANENT_HOME | This is a byref which has a permanent home. This means that it points to something which is acceptable to return to the callee; i.e. something in the gc heap, NOT a local variable or a location on stack. VER_FLAG_BYREF must also be set. |

FIG. 4

|  | Type | Flags | EEClass | UnderlyingArrayEEClass |
|---|---|---|---|---|
| String | Objref |  |  |  |
| String[] | Objref | Array | Object[] | String |
| &String[] | Objref | Byref \| Array | Object[] | String |
| Foo(...)[][] | Objref | Array | Object(...)[][] | Foo |
| &I4 | I4 | Byref |  |  |
| Null | Objref | Null |  |  |
| &Variant | Valueclass | Byref | Variant |  |
| Variant | Valueclass |  | Variant |  |
| Variant[] | Objref | Array | Variant[] | Variant |
| M/R/Boolean | Valueclass |  | M/R/Boolean |  |
| M/R/Integer4 | Valueclass |  | M/R/Integer4 |  |
| &M/R/Byte | Valueclass | Byref | M/R/Byte |  |

FIG. 5

| |
|---|
| Refcount (explained later) |
| Flags (only 1 bit is used here) |
| StackSlot (number of items on the stack) |
| Primitive local variable liveness bitmap |
| All other locals (fixed size array of Item) |
| Initialised fields bitmap (only present if a value class constructor) |
| Contents of stack -represented as a variable length array of Items |

FIG. 6

| "this" | Template | Compatible? |
| --- | --- | --- |
| String | Object | Yes |
| Object | String | No |
| String[] | Object | Yes |
| &String | &Object | No |
| I4 | I8 | No |
| M/R/Integer4 | I4 | Yes |
| I4 | M/R/Integer4 | Yes |
| Object <uninit> | Object | No |
| Object | Object <uninit> | No |
| &Object | &Object <addr of local var #5> | No |
| &Object <addr of local var #5> | &Object | Yes |
| &Object | &Object <permanent home> | No |
| &Object <permanent home> | &Object | Yes |
| &ValueClass <uninit> | &ValueClass | No |

FIG. 7

| Item1 | Item2 | Merge result |
|---|---|---|
| String | Object | Object |
| Object | I4 | ERROR |
| String[] | Object | Object |
| &String | &Object | DEAD |
| I4 | I8 | ERROR |
| M/R/Integer4 | I4 | I4 |
| I4 | M/R/Integer4 | I4 |
| Object <uninit> | Object | DEAD |
| &ValueClass <uninit> | &ValueClass | &ValueClass <uninit> |
| &Object | &Object <addr of local var #5> | &Object |
| &Variant <permanent home> | &Variant | &Variant |
| InputStream | OutputStream | Stream |
| InputStream[] | OutputStream[] | Stream[] |
| Object[][][] | Object[] | Array |
| Object | Null | Object |
| Foo[](,,,,,)[][][][] | Null | Foo[](,,,,,)[][][][] |
| M/R/Integer4[] | Object[] | Array |
| M/R/Integer1[] | M/R/UnsignedInteger1[] | M/R/Integer1[] |

FIG. 8

|  | I1<br>U1<br>Bool<br>VC(I1)<br>VC(U1) | I2<br>U2<br>Char<br>VC(I2)<br>VC(U2) | I4<br>U4<br>VC(I4)<br>VC(U4) | I8<br>U8<br>VC(I8)<br>VC(U8) | R4<br>VC(R4) | R8<br>VC(R8) | I<br>U | R | O(td) | &(ty) | &*(ty) | VC(td) |
|---|---|---|---|---|---|---|---|---|---|---|---|---|
| Arg slot | X | X | X | X | X | X | X | X | X | X | X | X |
| Local slot | X | X | X | X | X | X | X | X | X | X | X | X |
| Stack slot | - | - | - | X | - | X | X | X | X | X | X | X(C) |
| Target of & | X | X | X | X | X | X | X | X | - | - | - | X |
| Field | X | X | X | X | X | X | X | X | X | - | - | X |
| Argument to ret | X | X | X | X | X | X | X | X | X | - | X(B) | - |

FIG. 9(a)

|  | RefAny | Null | * | Uninit(ty) | &Uninit(n,ty) | UnconThis | &UninitVCField(n) |
|---|---|---|---|---|---|---|---|
| Arg slot | X | X | - | - | X | X | X |
| Local slot | X | X | - | X | X | X | X |
| Stack slot | X | X | - | - | X | X | X |
| Target of & | - | - | - | - | - | - | - |
| Field | - | - | - | - | - | - | - |
| Argument to ret | - | X | - | - | - | - | - |

FIG. 9(b)

| Type | Purpose |
|---|---|
| Uninit(*ty*) | Represents an uninitialized local variable, able to hold data of type *ty*. |
| &Uninit(*n,ty*) | Represents a pointer to the n'th uninitialized local, which is able to contain data of type *ty*. Only occurs on the stack prior to initializing a local variable that is a value class. |

FIG. 10

| Type | Purpose |
|---|---|
| UnconThis | Represents the uninitialized "this" pointer in a regular class constructor. The "this" pointer, stored in the first argument, becomes available when the constructor calls its superclass constructor, or when construction is delegated to another constructor in the same class. |

FIG. 11

| Type | Purpose |
|---|---|
| UnconThis | Represents the uninitialized "this" pointer, as in the object constructor case. |
| &UninitVCField(n,ty) | Represents a pointer to the n'th non-static field of the value class being initialized in a value class constructor, which must be of type ty. These pointers are generated when initializing sub-fields of a value class that are themselves value classes. The initialization is performed by passing the pointer to a constructor. |

FIG. 12

| Type | Purpose |
|---|---|
| &*(*ty*) | Represents a byref with a "home" that will be valid after the stack frame for the method being executed is destroyed. |

FIG. 13

Replacement Sheet

| Term | Meaning |
|---|---|
| address | A number $i$ such that $0 <= i <$ length(codes) |
| coerce(ty) | Coercion of a type to a stack type,<br>• If ty is one of I1, U1, I2, U2, I4, or U4 then the outcome is I.<br>• If ty is either I8 or U8 then the outcome is I8.<br>• Otherwise the result is ty |
| ty1 <: ty2 | The *subtype (also called the compatibility)* relation. This is the reflexive, transitive closure of the following rules:<br>• Null <: O(td). Here td is any class, interface or array type.<br>• O(Intf1) <: O(Intf2), if Intf1 inherits Intf2. Here Intf1 and Intf2 are interfaces.<br>• &*(ty) <: &(ty)<br>• O(C1) <: O(C2), if C1's superclass is C2 (C1 and C2 are classes)<br>• O(ty1[]) <: O(ty2[]), if O(ty1) <: O(ty2)<br>• O(C) <: O(Intf), if C implements Intf. Here C is a class and Intf is an interface. |
| ty1 ∪ ty2 | The least upper bound of two types by ty1 ∪ ty2. This least upper bound may or may not exist – a verification error will arise if we attempt to take the least upper bound of two incompatible types. |
| [ty0, ..., tyn-1] | An array of types, of length $n$. We write [] for the empty array. |
| array1+array2 | Concatenation of two arrays of types. |
| [ty1, ..., tym] <: [ty'1, ..., ty'n] | The subtype relation is extended to arrays of types: let [ty1, ..., tym] <: [ty'1, ..., ty'n] if and only if $m=n$ and tyi <: ty'i for $1 <= i <= n$. |
| [ty1, ..., tym] ∪ [ty'1, ..., ty'n] | The least upper bound of two arrays of types, if it exists. |

FIG. 15

| Term | Meaning |
|---|---|
| state | A *type state* (see above). |
| state1 <: state2 | The subtype relation extended to type state. True if and only if args1 <: args2, and so on for each corresponding item in the two states.<br>We define that fields1 <: fields2 iff the flags are pairwise related, with *initialised* <: *uninitialised*. We define block1 <: block2 iff block1 and block2 are exactly the same. |
| state1 ∪ state2 | The least upper bound of two type states, if it exists. Note taking the l.u.b. of two *fields* or two *tailcall-ok* flags is the same as taking their AND: the outcome is initialised iff both inputs are initialised. |
| inst | Some IL instruction |

FIG. 16

|  | control flow |
|---|---|
| beq, bne.un *k* | *next, k* |
| bge *k*<br>bge.un *k*<br>bgt *k*<br>bgt.un *k*<br>ble *k*<br>ble.un *k*<br>blt *k*<br>blt.un *k* | *next, k* |
| br *k* | *k* |
| brfalse *k*<br>brtrue *k* | *next, k* |
| endcatch | No destination |
| endfilter | No destination |
| endfinally | No destination |
| jmp *tok*<br>jmp | Not verifiable |
| leave *k* | *k* |
| ret | No destination |
| switch *k1,...,kn* | *next, k1, ..., kn* |
| call<br>callvirt | No destination if annotated by "tailcall", otherwise like a regular instruction. |

FIG. 17

| | stack typing | extra conditions |
|---|---|---|
| beq, bne.un *k* | [*ty, ty*] ⇒ [] | *ty* ∈ {I, I8, R, R8} See also the branching restrictions in the IL Instruction Set Description |
| bge *k*<br>bge.un *k*<br>bgt *k*<br>bgt.un *k*<br>ble *k*<br>ble.un *k*<br>blt *k*<br>blt.un *k* | [*ty1, ty2*] ⇒ [] | (1) *ty1=ty2* and *ty1* ∈ {I, I8, R}, or<br>(2) *ty1, ty2* ∈ {I, &(*ty*)}, or<br>(3) *ty1* is O(*td1*) and *ty2* is O(*td2*).<br>See also the branching restrictions in the IL Instruction Set Description |
| br *k* | [] ⇒ [] | See the branching restrictions in the IL Instruction Set Description |
| brfalse *k*<br>brtrue *k* | [I] ⇒ [] | See the branching restrictions in the IL Instruction Set Description |
| endcatch | [] ⇒ [] | must be verifying a "catch" section |
| endfilter | [I] ⇒ [] | must be verifying a "filter" section. |
| endfinally | [] ⇒ [] | must be verifying a "finally" section |
| jmp *tok*<br>jmpi | not verifiable | |
| leave *k* | [] ⇒ [] | |
| ret | [*res*] ⇒ [] | The current method's return type is *res*. A declared return type &(*ty*) is treated as &*(*ty*) for this purpose, i.e., only byrefs with a home may be returned from methods. Must be verifying a "normal" section. |
| | [] ⇒ [] | The current method's return type is void, or it is a constructor.<br><br>If the method is a constructor, *args[0]* must not be UnconThis.<br><br>Furthermore, if the method is a value class constructor then every element of *fields* must be set, i.e., all value class fields must be initialized.<br><br>Must be verifying a "normal" section |
| switch *k1,...,kn* | [I] ⇒ [] | See the branching restrictions in the IL Instruction Set Description |

FIG. 18

| | stack typing | extra conditions |
|---|---|---|
| add<br>add.ovf.i<br>add.ovf.u | [ty, ty] ⇒ [ty] | ty ∈ {I, I8, R} |
| and | [ty, ty] ⇒ [ty] | ty ∈ {I, I8} |
| arglist | [] ⇒ [I] | the method must take a variable number of arguments |
| ceq | [ty, ty] ⇒ [I] | ty ∈ {I, I8, R, R8} |
| cgt<br>cgt.un<br>clt<br>clt.un | [ty1, ty2] ⇒ [I] | (1) ty1=ty2 and ty1 ∈ {I, I8, R}, or<br>(2) ty1, ty2 ∈ {I, &(ty)}, or<br>(3) ty1 is O(td1) and ty2 is O(td2). |
| break | [] ⇒ [] | |
| ckfinite | [ty] ⇒ [ty] | ty ∈ {R, R8} |
| conv.t<br>conv.ovf.t | [ty] ⇒ [I] | ty ∈ {I, I8, R} and t ∈ {I1,U1,I2,U2,I4,U4,I} |
| | [ty] ⇒ [I8] | ty ∈ {I, I8, R} and t ∈ {I8} |
| | [ty] ⇒ [R] | ty ∈ {I, I8, R} and t ∈ {R4, R8} |
| cpblk | not verifiable | |
| div<br>div.un | [ty, ty] ⇒ [ty] | ty ∈ {I, I8, R} |
| dup | [ty] ⇒ [ty, ty] | any non-value-class stack type ty |
| initblk | not verifiable | |
| jmp tok | not verifiable | |
| jmpi | not verifiable | |
| ldarg i | [] ⇒ [coerce(args[i])] | 0<=i<NumArgs and args[i] is not a value class. |
| ldarga i | [] ⇒ [&(ty)] | 0<=i<NumArgs and ty = args[i]. ty must be a valid type to construct a & (see table of types in FIGs. 9(a) and 9(b))<br><br>Also set tailcall-ok to false. |
| ldc.t | [] ⇒ [ty] | (t,ty) ∈ {(I4,I), (I8,I8), (R4,R), (R8,R)} |
| ldc.i.j | [] ⇒ [I] | |
| ldc.i4 | [] ⇒ [I] | |
| ldftn | not verifiable | |
| ldind.t | [&(ty)] ⇒ [coerce(ty)] | t is compatible with ty |
| ldloc i | [] ⇒ [coerce(locals[i])] | 0<=i<NumLocals and locals[i] is not a value class. |
| ldloca i | [] ⇒ [&(locals[i])] | 0<=i<NumLocals and locals[i] is a valid type to construct a & (see table of types). Also set tailcall-ok to false. |
| | [] ⇒ [&Uninit(i,ty)] | 0<=i<NumLocals and locals[i] = Uninit(ty). This is used to initialize value-class locals. tailcall-ok is unchanged. |

FIG. 19(a)

| | | |
|---|---|---|
| ldnull | [] ⇒ [Null] | |
| ldptr | not verifiable | |
| localloc | not verifiable | |
| mul<br>mul.ovf.i<br>mul.ovf.u | [ty, ty] ⇒ [ty] | ty ∈ {I, I8, R} |
| neg | [ty] ⇒ [ty] | ty ∈ {I, I8} |
| nop | [] ⇒ [] | |
| not | [ty] ⇒ [ty] | ty ∈ {I, I8} |
| or | [ty, ty] ⇒ [ty] | ty ∈ {I, I8} |
| pop | [ty] ⇒ [] | any stack type ty, including value class types. |
| rem | [ty, ty] ⇒ [ty] | ty ∈ {I, I8, R} |
| rem.un | [ty, ty] ⇒ [ty] | ty ∈ {I, I8} |
| shl, shr, shr.un | [ty, I] ⇒ [ty] | ty ∈ {I, I8} |
| starg i | [coerce(args[i])] ⇒ [] | 0<=i<NumArgs |
| stind.t | [&(ty), coerce(ty)] ⇒ [] | t is compatible with ty |
| stloc i | [coerce(locals[i])] ⇒ [] | This case is used if somewhere in the method there is a ldloca i. and locals[i] <> Uninit(ty'), then we must have 0<=i<NumLocals and locals[i] is not a value class type.<br><br>locals[i] is unchanged. |
| | [coerce(ty)] ⇒ [] | This case is used if somewhere in the method there is a ldloca i and locals[i] = Uninit(ty). We must have 0<=i<NumLocals and locals[i] is not a value class type.<br><br>locals[i] is replaced by ty. |
| | [ty] ⇒ [] | This case is used if somewhere in the method there is a ldloca i. We must have 0<=i<NumLocals and locals[i] is not a value class type.<br><br>Some l.u.b must exist between ty and locals[i] (or ty' if locals[i] is Uninit(ty')), i.e. the base types for ty and the local slot must be compatible.<br><br>locals[i] is replaced by ty, i.e. the actual type popped off the stack. |
| sub<br>sub.ovf.i<br>sub.ovf.u | [ty, ty] ⇒ [ty] | ty ∈ {I, I8, R} |
| switch | [I] ⇒ [] | |
| unaligned | [] ⇒ [] | |
| volatile | [] ⇒ [] | |
| xor | [ty, ty] ⇒ [ty] | ty ∈ {I, I8} |

FIG. 19(b)

|  | stack typing | conditions |
|---|---|---|
| box *tok* | [&(VC(*td*))] ⇒ [O(*td*)] |  |
| castclass *td* | [O(*td'*)] ⇒ [O(*td*)] |  |
| cpobj *td* | [&(VC(*td*)), &(VC(*td*))] ⇒ [] |  |
|  | [&UnintVCField(*n*, VC(*td*)), &(VC(*td*))] ⇒ [] | In the new type state, *fields*[*n*] is set to *true* |
| entercrit | [O(*td*)] ⇒ [] |  |
| exitcrit | [O(*td*)] ⇒ [] |  |
| initobj *td* | [&(VC(*td*))] ⇒ [] |  |
|  | [&UnintVCField(*n*, VC(*td*))] ⇒ [] | In the new type state, *fields*[*n*] is set to *true* |
| isinst *td* | [O(*td'*)] ⇒ [I] |  |
| ldelema | [O(*td*), I] ⇒ [&*(*ty*)] | *td* is a 0-based 1-dimensional array of *ty*'s |
| ldelem.*t* | [O(*td*), I] ⇒ [coerce(*ty*)] | *td* is a 0-based 1-dimensional array of *ty*'s, and *t* and *ty* are compatible |
| ldlen | [O(*td*)] ⇒ [I] | *td* is a 0-based 1-dimensional array |
| ldobj *td* | [&(VC(*td*))] ⇒ [VC(*td*)] | *td* is a value class. This is used to pass a value class as a parameter. |
| ldrefany *i* | [] ⇒ [RefAny] | 0<=*i*<NumArgs and the type of argument *i* is RefAny. |
| ldrefanya *i* *td* | [] ⇒ [&(O(*td*))] | 0<=*i*<NumArgs, *td* is a typedef token, and the type of argument *i* is RefAny |
| ldstr *addr* | [] ⇒ [O(*td*)] | *td* is the typedef token for String, and *addr* points into the .text section, and a null appears at the end of the .text section. |
| ldtoken *tok* | [] ⇒ [I] | *tok* is a valid metadata token |
| ldvirtfn *tok* | not verifiable |  |
| mkrefany *td* | [&(O(*td*))] ⇒ [RefAny] |  |
| newarr.*t* | [I] ⇒ [O(*td*)] | *td* refers to a 1-dimensional array of a type compatible with *t* |
| newoarr *td1* | [I] ⇒ [O(*td2*)] | *td1* refers to a type and *td2* refers to a 1-dimensional array of *td1*'s |
| stelem.*t* | [O(*td*), I, coerce(*ty*)] ⇒ [] | *td* is a 0-based 1-dimensional array of *ty*'s, and *t* and *ty* are compatible. |
| throw | [O(*td*)] |  |
| typerefany | not verifiable |  |
| unbox *td* | [O(*td*)] ⇒ [&(VC(*td*))] | *td* refers to a value class. |

FIG. 20

|  | stack typing | conditions |
|---|---|---|
| call *md* | [coerce(*x1*),..., coerce(*xn*)] ⇒ [] | *md* is static, not a constructor, *rty* = void. |
|  | [coerce(*x1*),..., coerce(*xn*)] ⇒ [coerce(*rty*)] | *md* is static, not a constructor, *rty* is not void. |
|  | [*T*, coerce(*x1*),..., coerce(*xn*)] ⇒ [] | *md* is non-static, not a constructor, *rty* = void. |
|  | [*T*, coerce(*x1*),..., coerce(*xn*)] ⇒ [coerce(*rty*)] | *md* is non-static, not a constructor, *rty* is not void. |
|  | [*ty*, coerce(*x1*),..., coerce(*xn*)] ⇒ [] | *md* is a non-static, non-value-class constructor.<br><br>We must be verifying (as well as calling) a constructor, thus we are calling our superclass constructor, or delegating construction to another constructor in our own class. After we do this the "this" pointer (stored in *args[0]*) becomes available for normal use. More formally, this means:<br>• *T* = O(*this*) or *T* = O(*super*), where *this* is the type containing the method being verified and *super* is its superclass,<br>• *ty* = UnconThis, and<br>• *args[0]* = UnconThis<br>In the new type state *args[0]* now becomes O(*this*). |
|  | [*ty*, coerce(*x1*),..., coerce(*xn*)] ⇒ [] | *md* is a non-static value-class constructor.<br><br>Three possibilities arise:<br><br>(1) We are initializing a local variable that is a value class, by calling a constructor on the appropriate pointer. That is, *ty* = &Uninit(*n*,VC(*T*)), and in the new type state *locals[n]* is set to VC(*T*), or<br><br>(2) We are verifying (as well as calling) a value-class-constructor, and we are initializing a value class field within the value class being constructed. That is, *ty* = &UninitVCField(*n*, VC(*T*)). In the new state we update *fields[n]* to true, so that field is now considered initialized. If all of *fields* is now set, and *args[0]* contains UnconThis, then *args[0]* becomes &(VC(*this*)) in the new state.<br><br>(3) We are delegating construction as above, by calling another constructor in our own class. After we do this the "this" pointer (stored in *args[0]*) becomes available for normal use. More formally, this means:<br>• *T* must be the type containing the method being verified,<br>• *args[0]* = *ty* = UnconThis<br>In the new type state *args[0]* becomes &(VC(*this*)). |

FIG. 21(a)

| | | | |
|---|---|---|---|
| | | | In the above cases where *rty* = void, then if the instruction is annotated by tailcall then the current method's return type must be void, and *tailcall-ok* must be true. |
| | | | In the above cases where *rty* is not void, then if the instruction is annotated by tailcall then *rty* <: *res* where the current method's return type is *res* and *tailcall-ok* must be true. |
| calli *callsitedescr* | not verifiable | | |
| callvirt *md* | [*T*, coerce(*x1*),..., coerce(*xn*)] ⇒ [] | | *md* is virtual, *rty* = void. If the instruction is annotated by tailcall then the current method's return type must be void, and *tailcall-ok* must be true. |
| | [*T*, coerce(*x1*),..., coerce(*xn*)] ⇒ [coerce(*rty*)] | | *md* is virtual, *rty* is not void. If the instruction is annotated by tailcall then *rty* <: *res* where the current method's return type is *res* and *tailcall-ok* must be true. |
| newobj *md* | [coerce(*x1*),..., coerce(*xn*)] ⇒ [O(*T*)] | | *md* is a non-static constructor, and *md* resolves to a method with signature *rty* *T*::*method* (*x1*, ..., *xn*) where *rty* is the return type. |

FIG. 21(b)

|  | stack typing | conditions |
|---|---|---|
| ldfld fd | [O(T)] ⇒ [coerce(fty)] | |
|  | [&(VC(T))] ⇒ [coerce(fty)] | |
| ldflda fd | [O(T)] ⇒ [&*(fty)] | |
|  | [&(VC(T))] ⇒ [&(fty)] | |
|  | [&*(VC(T))] ⇒ [&*(fty)] | |
|  | [UnconThis] ⇒ [&UninitVCField(n,fty) | T = *this* where *this* is the type of the method being verified, which must be a value class. *n* must be the field index of the field within T. |
| ldsfld fd | [] ⇒ [coerce(fty)] | |
| ldsflda fd | [] ⇒ [&*(fty)] | |
| stfld fd | [O(T), coerce(fty)] ⇒ [] | |
|  | [&VC(ty), coerce(fty)] ⇒ [] | |
|  | [UnconThis, coerce(fty)] ⇒ [] | T = *this* where *this* is the type of the method being verified. T must be a value class. If *n* is the index of the field in T then *fields[n]* becomes set in the new type state, i.e., the field becomes initialized. If all of *fields* is now set, and *args[0]* contains UnconThis, then *args[0]* becomes &(VC(*this*)) in the new state. |
| stsfld fd | [coerce(fty)] ⇒ [] | |

FIG. 22

| | |
|---|---|
| I1 | 8-bit 2's complement signed value |
| U1 | 8-bit unsigned binary value |
| I2 | 16-bit 2's complement signed value |
| U2 | 16-bit unsigned binary value |
| I4 | 32-bit 2's complement signed value |
| U4 | 32-bit unsigned binary value |
| I8 | 64-bit 2's complement signed value |
| U8 | 64-bit unsigned binary value |
| R4 | 32-bit IEEE 754 floating point value |
| R8 | 64-bit IEEE 754 floating point value |
| I | natural size 2's complement signed value |
| U | natural size unsigned binary value, also unmanaged pointer |
| R | natural size floating point value |
| O | natural size object reference to managed memory |
| & | natural size managed pointer (may point into managed memory) |

FIG. 24

| | |
|---|---|
| add | Numeric |
| add.ovf.* | Specific Integer |
| and | Integer |
| beq[.s] | Numeric |
| bge[.s] | Numeric |
| bge.un[.s] | Unsigned/unordered |
| bgt[.s] | Numeric |
| bgt.un[.s] | Unsigned/unordered |
| ble[.s] | Numeric |
| ble.un[.s] | Unsigned/unordered |
| blt[.s] | Numeric |
| blt.un[.s] | Unsigned/unordered |
| bne.un[.s] | Unsigned/unordered |
| ceq | Numeric |
| cgt | Numeric |
| cgt.un | Unsigned/unordered |
| ckfinite | Floating point |
| clt | Numeric |
| clt.un | Unsigned/unordered |
| conv.* | Specific |
| conv.ovf.* | Specific |

| | |
|---|---|
| div | Numeric |
| div.un | Integer unsigned |
| ldc.* | Load Constant |
| ldelem.* | Specific |
| ldind.* | Specific |
| mul | Numeric |
| mul.ovf.* | Specific |
| neg | Integer |
| newarr.* | Specific |
| not | Integer |
| or | Integer |
| rem | Numeric |
| rem.un | Integer unsigned |
| shl | Integer |
| shr | Integer |
| shr.un | Specific |
| stelem.* | Specific |
| stind.* | Specific |
| sub | Numeric |
| sub.ovf.* | Specific |
| xor | Integer |

FIG. 25

| Type of Home | Runtime Address Computation | JITtime Type Determination |
|---|---|---|
| Argument | ldarga | Method signature |
| Local Variable | ldloca | Locals signature in method header |
| Field | ldlfda | Type of object |
| Static | ldslfda (or ldflda) | Type of class, interface, or module |
| Array Element | ldelema (or library call) | Type of array |

FIG. 26

| Type of data | Pass By | How data is sent |
|---|---|---|
| Built-in value type (int, float, etc.) | Value | Copied to called method, type statically known at both sides |
| | Reference | Address sent to called method, type statically known at both sides |
| | Ref-Any | Address sent along with type information to called method |
| User-defined value class | Value | Called method receives a copy (but copy may be done by either calling method or called method), type statically known at both sides |
| | Reference | Address sent to called method, type statically known at both sides |
| | Ref-Any | Address sent along with type information to called method |
| Object class | Value | Reference to data sent to called method, type statically known and class available from reference |
| | Reference | Address of reference sent to called method, type statically known and class available from reference |
| | Ref-Any | Address of reference sent to called method along with static type information, class (i.e. dynamic type) available from reference |

FIG. 27 ns is a continuation with reference to the drawings.

VERIFIER TO CHECK INTERMEDIATE LANGUAGE

RELATED APPLICATION

This application is a continuation of, and claims priority to, U.S. patent application Ser. No. 09/388,176 filed on Sep. 1, 1999 now U.S. Pat. No. 6,560,774 and entitled "VERIFIER TO CHECK INTERMEDIATE LANGUAGE", which is hereby incorporated by reference in its entirety.

FIELD OF THE INVENTION

This invention relates generally to intermediate languages, such as intermediate languages compilable from multiple language sources, and more particularly a verifier for such intermediate language.

BACKGROUND OF THE INVENTION

Intermediate language-type models for programming languages have become increasingly popular. In an intermediate language model, a source code is generally compiled into a desirably substantially platform independent intermediate language. When the code is desired to be run on a particular platform, an execution engine on that platform then just-in-time compiles, interprets, or compiles the intermediate language-type computer programming languages include Component Object Model Plus (COM+), and the JAVA programming language.

A difficulty arises in intermediate language-type models in that, in some circumstances, the execution engine needs to run untrusted code. Untrusted code is code having an author that cannot be authenticated, and thus may cause problems with the host machine running the code. For example, untrusted code could attack the execution engine. This could be accomplished by, for example, casting between integers and object references, accessing fields that are intended to be private, failing to initialize objects correctly, overflowing the stack, or referring to arguments or local variables that do not exist.

One solution to this problem is to construct a defensive execution engine that performs a variety of run-time checks to prevent all such attacks. However, this can cause a substantial reduction in execution speed for untrusted code, rendering the execution engine an inefficient platform.

For these and other reasons, there is a need for the invention.

SUMMARY OF THE INVENTION

The invention relates to a verifier to check intermediate language code. In one embodiment, a computer-implemented method first verifies metadata of an intermediate language code for consistency and accuracy, and then verifying the intermediate language code for consistency and accuracy. This latter part in one embodiment is accomplished by performing first a syntactic check of the intermediate language code, and then a semantic check of the intermediate language code.

Embodiments of the invention thus provide for advantages not found in the prior art. Static type-checking can be performed on untrusted intermediate language code, such that only well-typed untrusted code is executed. Type-checking is performed by a verifier in one embodiment. The type system implemented by the verifier can be designed to prevent attacks on the execution engine by untrusted execution. The type system can check and verify byrefs, value classes, refany's, and native-size primitive types, among other aspects.

The invention includes computer-implemented methods, machine-readable media, computerized systems, and computers of varying scopes. Other aspects, embodiments and advantages of the invention, beyond those described here, will become apparent by reading the detailed description and with reference to the drawings.

BRIEF DESCRIPTION OF THE DRAWINGS

FIG. 4 is a table of flags used by the verifier in one embodiment of the invention;

FIG. 5 is a table listing example flags used by the verifier in one embodiment of the invention;

FIG. 6 is a layout of an EntryState data structure that is used by the verifier in one embodiment of the invention;

FIG. 7 is a table showing the functionality of the item CompatibleWith that is used by the verifier in one embodiment of the invention;

FIG. 8 is a table showing examples of merging that is used by the verifier in one embodiment of the invention;

FIG. 9(*a*) and FIG. 9(*b*) show a table of different types that appear at different places during verification, according to one embodiment of the invention;

FIG. 10 is a table showing special types for verifying the correct use of uninitialized locals, according to one embodiment of the invention;

FIG. 11 is a table summarizing the IL type verification that constructors must construct, according to one embodiment of the invention;

FIG. 12 is a table summarizing the IL type verification that value class fields must be initialized, according to one embodiment of the invention;

FIG. 13 is a table summarizing the IL type verification that only special Byref's may be returned, according to an embodiment of the invention;

FIG. 15 is a diagram showing the definitions for the semantic checks of the second pass of IL verification, according to one embodiment of the invention;

FIG. 16 is a table summarizing the IL verification of semantic checks, specifically type states, according to an embodiment of the invention;

FIG. 17 is a table specifying the destination addresses of an instruction, for use in the IL verification of semantic checks, according to an embodiment of the invention;

FIG. 18 is a table showing the effect of various control flow instructions on the type state, in conjunction with the IL verification of semantic checks, according to an embodiment of the invention;

FIG. 19(*a*) and FIG. 19(*b*) are a table showing the effect of various basic flow instructions on the type state, in conjunction with the IL verification of semantic checks, according to an embodiment of the invention;

FIG. 20 is a table showing the effect of various object model instructions on the type state, in conjunction with the IL verification of semantic checks, according to an embodiment of the invention;

FIG. 21(a) and FIG. 21(b) are a table showing the effect of various method call instructions on the type state, in conjunction with the IL verification of semantic checks, according to an embodiment of the invention;

FIG. 22 is a table showing the effect of various field instructions on the type state, in conjunction with the IL verification of semantic checks, according to an embodiment of the invention;

FIG. 24 is a table showing the data types directly supported by an execution engine in one embodiment of the invention;

FIG. 25 is a table showing the intermediate language instructions that deal with numeric values, along with the category to which they belong, according to one embodiment of the invention;

FIG. 26 is a table summarizing a manner to compute the address of the home location and a manner to determine the type of a home location, according to one embodiment of the invention;

FIG. 27 is a table the parameter passing convention used for each data type, according to one embodiment of the invention; and, FIG. 28 is a diagram of an implementation of a verifier according to an embodiment of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
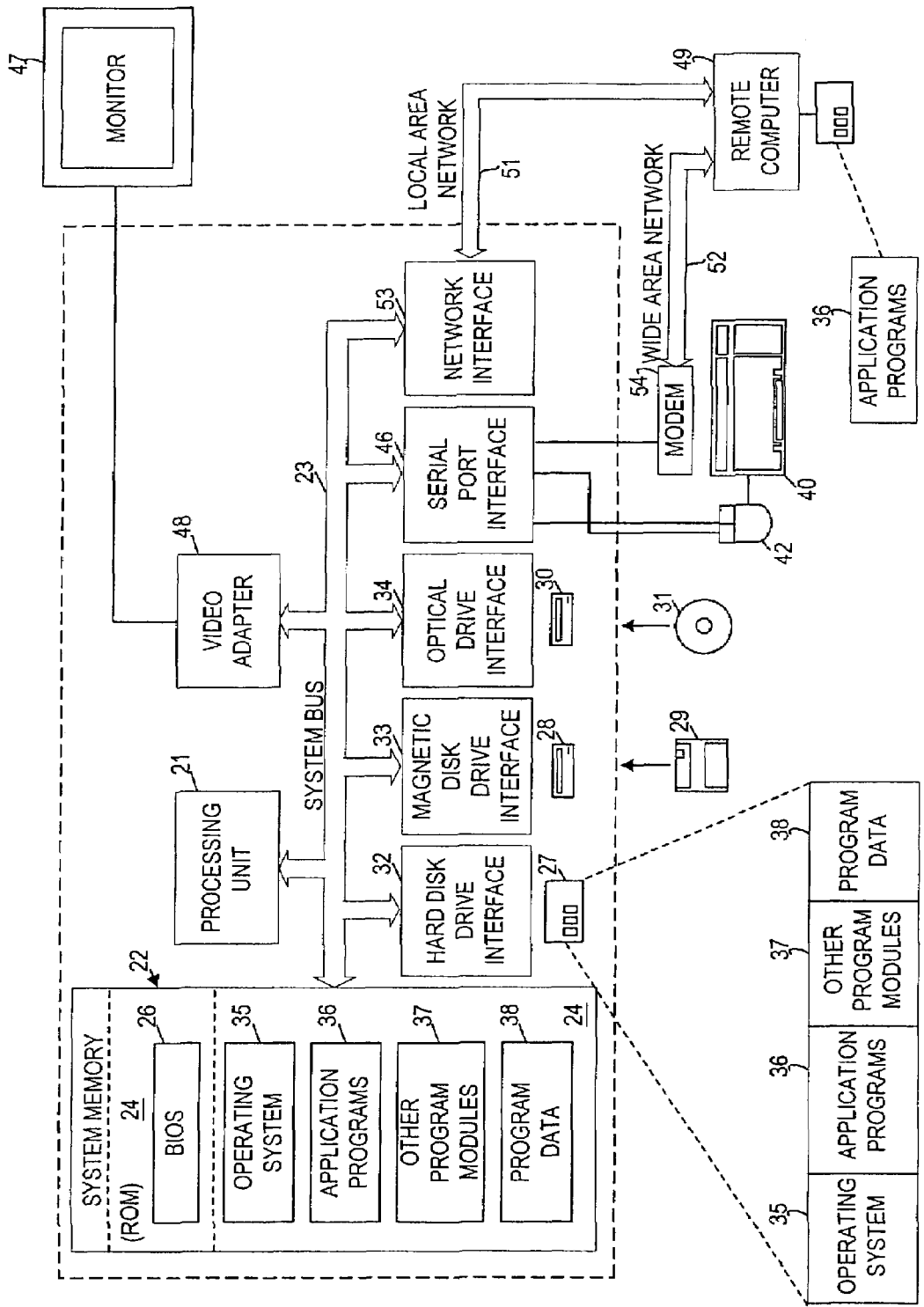
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Overview

In this section, description is provided of an overview of an embodiment of the invention. The overview is a general description of one embodiment of the invention. Both a description of a system and a method, according to embodiments of the invention, are provided. After this section, a more detailed description of one embodiment of the invention is provided, with specific reference to the COM+ programming language, that is, the intermediate language supported by the COM+ run-time. Those of ordinary skill within the art can appreciate, however, that the invention is not so limited to COM+ or any other intermediate language-type programming language; one other example of such a programming language is the JAVA programming language, that is, the byte code language of the JAVA virtual machine.

Figure 2:
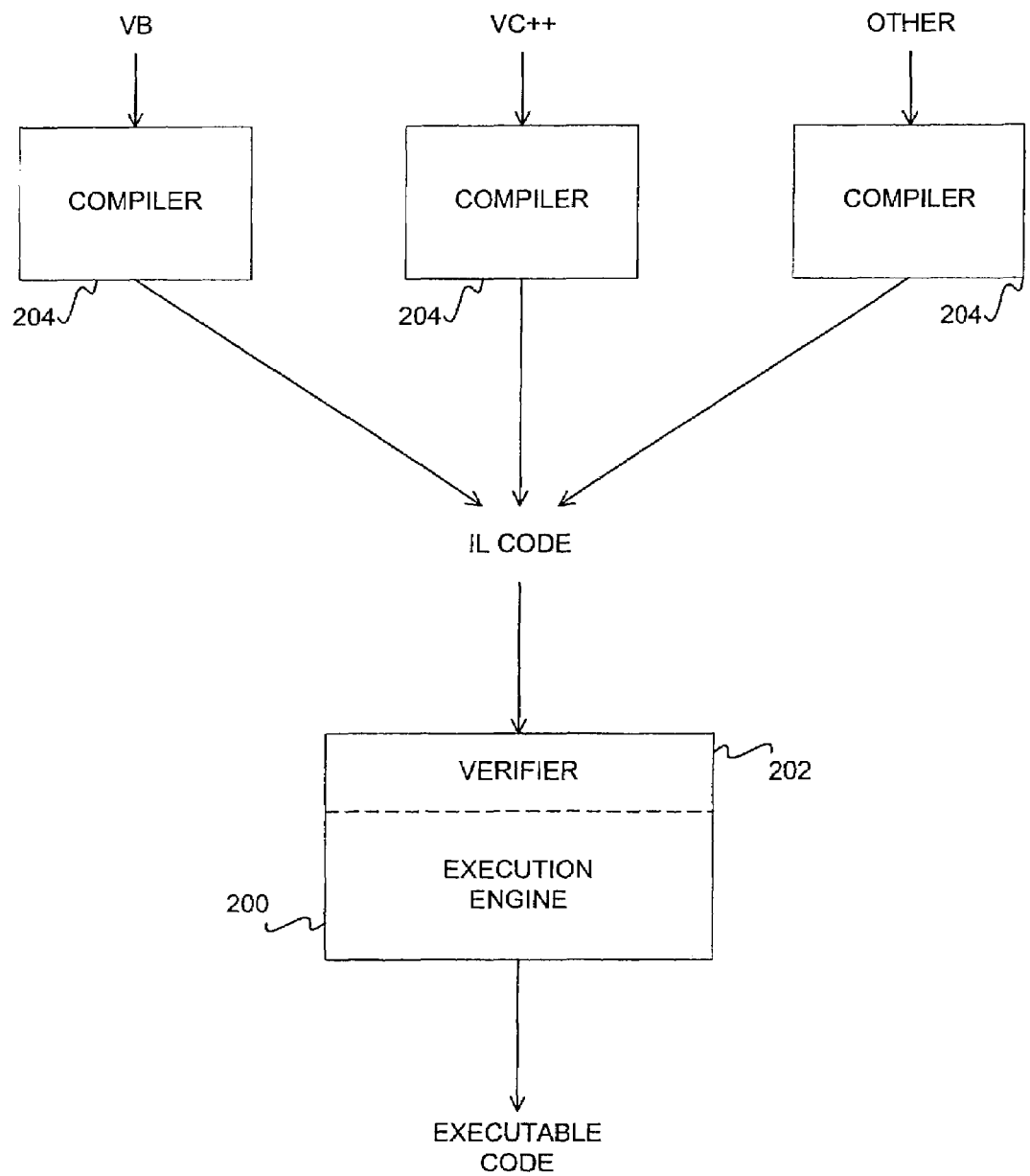
FIG. 2 is a diagram of a system according to an embodiment of the invention.

Referring first to FIG. 2, a diagram of a system according to an embodiment of the invention is shown. The system includes an execution engine 200, of which a verifier 202 is a part. Multiple source code language sources, such a VISUAL BASIC (VB), VISUAL C++ (VC++), and other sources, are compiled, by compilers such as compilers 204, into intermediate language (IL) code. The execution engine 200 then compiles, interprets, or just-in-time compiles the IL code into executable code (based on the intermediate code) native to a particular platform. That is, the execution engine 200 translates the intermediate code to the executable code for execution. The verifier 202 verifies the IL code prior to the code being compiled, interpreted, or just-in-time compiled (that is, prior to translation thereof to executable code).

In one embodiment, the verifier 202 verifies the intermediate language code as well as metadata of the IL code (as will be described). Furthermore, in one embodiment, the verifier 202 verifies the IL code by performing a syntactic and a semantic check of the IL code, as will be described later in the detailed description. For example, a semantic check of the code can in varying embodiments include checking byrefs and refany's of the code (referred to generally as reference aspects of the code), value classes of the code, native-size primitive types of the code, tail calls of the code, as well as other aspects of the IL code. The invention is not so limited, however.

Each of the compilers 204, the verifier 202, and the execution engine 200 can in one embodiment be a computer program executed by a processor from a computer-readable medium such as a memory. Compilers such as compilers 204 are known within the art. The verifier 202 and the execution engine 200 in one embodiment is as is described in more detail later in the detailed description. Each of the multiple source code language source, the IL code, and the executable code can in one embodiment be stored as data on a computer-readable medium, such as a memory or a hard disk drive. The invention is not so limited, however.

Figure 3:
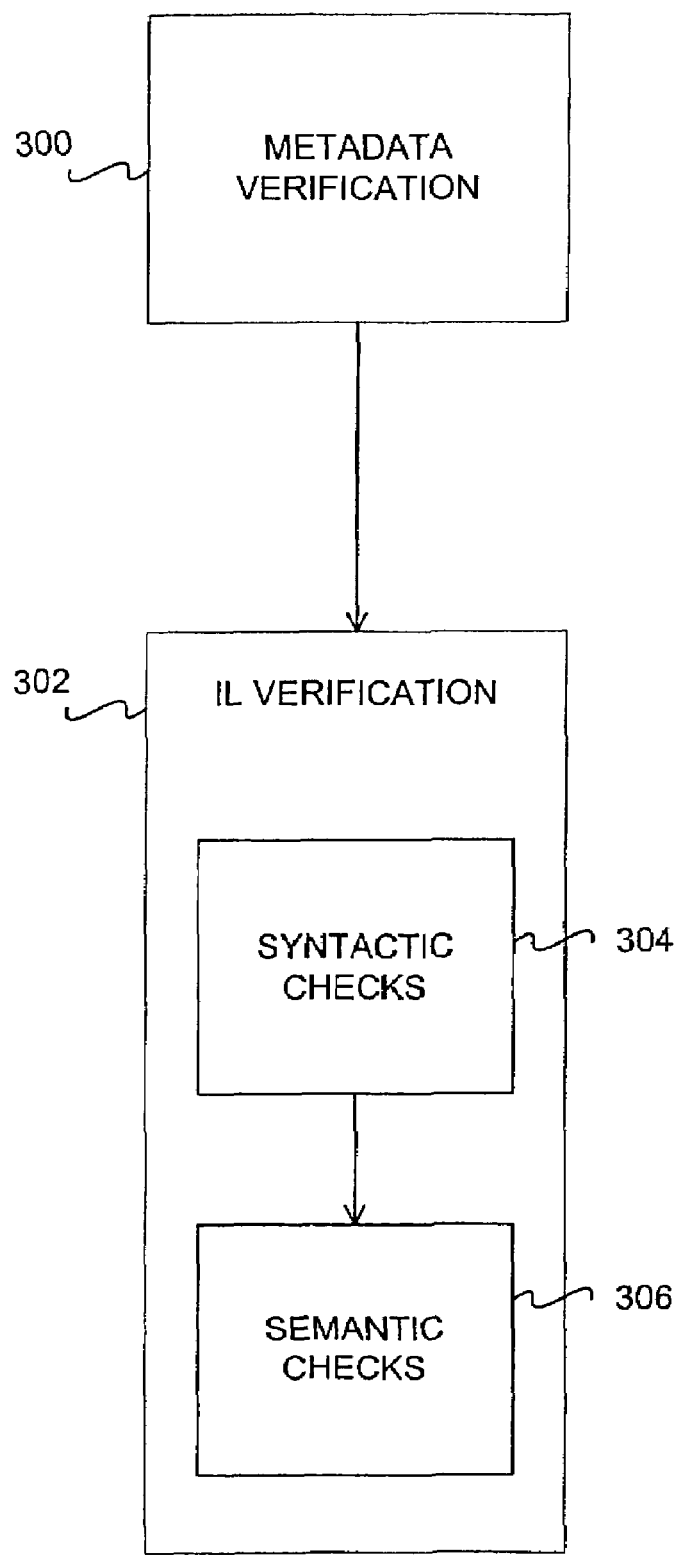
FIG. 3 is a flowchart of a method according to an embodiment of the invention.

Referring next to FIG. 3, a flowchart of a computer-implemented method according to an embodiment of the invention is shown. The method of FIG. 3 in one embodiment is the manner by which the verifier 202 of FIG. 2 accomplishes verification of IL code, although the invention is not necessarily so limited. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

In 300, the method first performs verification of metadata of the IL code for consistency and accuracy. Metadata of the IL code is described in more detail later in the detailed description. In 302, the method next performs verification of the IL code itself for consistency and accuracy. This is conducted in one embodiment in two passes: a first pass 304 to perform syntactic checks of the IL code, and a second pass 306 to perform semantic checks of the IL code. Example syntactic and semantic checks are described later in the detailed description. However, semantic checks in varying embodiments of the invention include: reference aspect checks (such as byref and refany checks), value class checks, native-size primitive type checks, and tail call verifications, as are described in more detail later in the detailed description.

Not shown in FIG. 3 is that the method can include initially generating the intermediate language code by compiling a source code, such as a source VC++ or VB code, into the IL code. Furthermore, not shown in FIG. 3 is that the method can include subsequently executing the intermediate language code upon verification of the code and the metadata thereof, by translating the intermediate language code into executable code native to a host platform (i.e., by compiling, just-in-time compiling, or interpreting the IL code into executable code). The invention is not so limited, however.

Implementation of an IL Verifier

In this section of the detailed description, a general implementation of an IL verifier, according to one embodiment of the invention, is presented. A more specific implementation of a verifier is presented in the next sections of the detailed description. The implementation described in this section is made with reference to FIG. 28.

Figure 28:
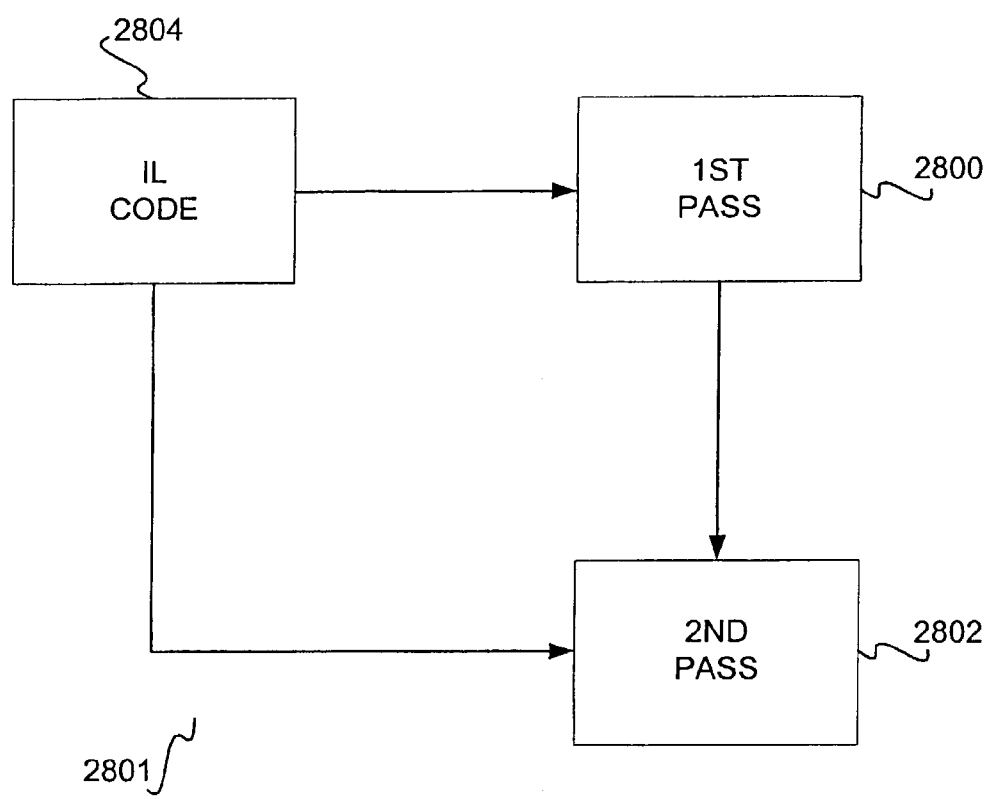

Referring now to FIG. 28, a verifier 2801 according to an embodiment of the invention includes a first-pass component 2800 and a second-pass component 2802. Each component 2800 and 2802 can in one embodiment be implemented as a computer program, or one or more parts thereof, executed by a processor from a computer-readable medium such as a memory or a hard disk drive. The IL code 2804 to be verified is input into both components 2800 and 2802. Generally, the component 2800 performs syntactic checks, and the component 2802 performs semantic checks, as has been described.

In the first pass conducted by the component 2800, the locations of all the basic blocks of the code 2804 are determined, and in one embodiment are prepared into a sorted list. The basic blocks of the code 2804 are defined in one embodiment as minute sections of the IL code 2804 such that each basic block includes one or more instructions of the IL code 2804. The first pass ensures that all branch destinations—for example, jump instructions to other basic blocks of code—are proper, and in one embodiment, ensures that all branch destinations are on instruction boundaries, as opposed to within the middle of an instruction, for example.

In the second pass conducted by the component 2802, other checks are performed, as described within the next sections of the detailed description. For each opcode to be verified, in particular, there is a list of operations and checks that can be performed. In one embodiment, for most opcodes, this means that no code needs to be written to handle the opcode; instead, a string exists for the opcode that details how the verification should be performed. For example, a string such as "44:4" may specify "pop two four byte integers from the stack, and then push a four byte integer on the stack."

In one particular embodiment, for aid in verification, some assumptions are made regarding the code. First, the type of the arguments to any method in the code being verified are fixed. If an argument is declared as a string, for example, then whenever the argument is loaded onto the stack, a string will always result, even if a subclass of a string is stored. This means that dynamic type information for arguments do not need to be maintained on a per-basic block basis.

Second, the type of primitive local variables, such as integers, floating points, etc., is fixed. If a variable is declared as being a primitive type, then it is not allowed to store a non-primitive type, such as an object reference, into it. In this manner, a single bit—"live" or "dead" for example—is sufficient to convey a primitive variable's state at any point. For non-primitive variables, however, complete type information must be maintained.

More Specific Implementation Design of an IL Verifier

The next three sections of the detailed description, including this section, relate to varying degrees specifically to the COM+ intermediate language—that is, to a verifier and an execution engine for the COM+ intermediate language. The description provided in these sections is such that it is understandable to those of ordinary skill within the art. It is noted, however, that the invention itself is not limited to the details provided herein in these three sections. In this section in particular, the implementation design of an IL verifier, as can be used in conjunction with a system or a method of an embodiment of the invention as already described, is provided.

Background

The verifier in one embodiment simulates method execution by pushing and popping the appropriate types as instructions are seen, as can be appreciated by those of ordinary skill within the art. Loads from and stores into local variables, arguments, and fields are checked for type safety, as are the arguments to method calls.

The verifier keeps track of the "current state" as it simulates instructions. The current state includes the contents of the stack, the local variables, and the arguments. If verifying a constructor method, it also keeps track of the initialization status of the "this" pointer.

Whenever execution leaves the current basic block and can enter one or more basic blocks, the current state is propagated to all unvisited destination basic blocks, which are then queued for visiting. Destination basic blocks which have already been visited will already have a state, E, associated with them; this state is compared with the current state, S. If S is compatible with E (i.e. S is a subset of E), then nothing happens. If S is not a subset of E, then the S and E are merged conservatively, and this merged state is stored back into the destination basic block, which is then queued for re-visiting.

A new basic block is dequeued whenever the verifier encounters a control flow instruction which does not cause it to visit other basic blocks (for example, a "ret" instruction, or a conditional branch where all destinations have already been visited, and the states match). Otherwise it follows one of the unvisited control flow paths.

Two Pass System

The verifier uses a two pass system to verify a method. The first pass is simple and fast, and performs the following tasks:

It determines the location of all of the basic blocks, and creates a sorted array of them (m_pBasicBlockList).

It ensures that all jump destinations land on instruction boundaries, and are inside the method.

It determines which locals have their address taken. This is because if a local declared to contain an objref has its address taken, then its type is fixed—no matter what is stored into the local, reading from the local will always return its declared type (due to the problem of aliasing, the verifier must always be conservative here).

A new basic block starts on:

The destination of a conditional branch

The instruction after a conditional branch, unconditional branch, throw, or return All destinations of a switch, including the fall through case The start of a try clause The end of a try clause (i.e. the instruction after the last instruction inside the try clause)

The start of a catch clause handler

The start of a filter clause handler (if the exception clause has a filter)

All three tasks are accomplished by creating two bitmaps. These bitmaps are short lived, and exist only on this quick first pass of the verifier. Each bitmap has one bit per byte of IL code. The first bitmap will have a bit set corresponding to the start of each instruction, while the second bitmap will have a bit set corresponding to the start of each basic block.

First, the exception list is traversed, and the catch clauses, filters, and start and end of try clauses are set as being the start of a basic block. The first instruction in the method is also set as being the start of a basic block.

Then, the method's instructions are decoded from start to end in a linear fashion, not following control flow. A safe function is used to conservatively decode opcodes and operand data, which detects invalid instructions, or running off the end of the code.

The appropriate bits in the start-of-instruction bitmap are set as the opcodes are decoded. As control flow instructions are seen (all branches, throw, return, switch), the appropriate bits are set in the basic block boundary bitmap.

Once the end of the method is reached, a check is made to ensure that wherever a basic block was said to begin, it was also the beginning of an instruction. This catches attempts to jump into the middle of an instruction.

A sorted list of basic blocks is made by traversing the basic block bitmap linearly.

Data Structures

There are Three Significant Data Structures in the Verifier:

Item. An Item represents a data type, and is used to store the current contents of local variables, stack entries, and globally known argument types and local variable types.

BasicBlock. A basic block contains only two fields—the program counter (offset into the method code) where the basic block starts, and an EntryState, providing the logical state of the machine at that point (or NULL if the basic block has not been visited or queued yet).

EntryState. Provides a description of the current state. Defines the contents and liveness of all local variables, the size and contents of the stack, whether the "this" pointer is initialized. If verifying a value class constructor method, there is also a bitmap indicating which fields have been initialized.

An Item comprises three components:

m_dwFlags (a DWORD containing a variety of information)

m_pEEClass (optional)

m_pUnderlyingArrayClass (optional)

The lower 6 bits of m_dwFlags provide basic type information (known as the "type component"), as defined in CorElementType. Only a subset of types in CorElementType are used:

ELEMENT_TYPE_I1

ELEMENT_TYPE_I2

ELEMENT_TYPE_I4

ELEMENT_TYPE_I8

ELEMENT_TYPE_R4

ELEMENT_TYPE_R8

ELEMENT_TYPE_CHAR

ELEMENT_TYPE_BOOLEAN

ELEMENT_TYPE_VOID

In addition to these types, the verifier extends the enumeration with the following:

VER_ELEMENT_TYPE_OBJREF

VER_ELEMENT_TYPE_BYREF

VER_ELEMENT_TYPE_VALUE_CLASS

The CorElementType enumerations for ELEMENT_TYPE_CLASS and ELEMENT_TYPE_VALUE_CLASS are not used. Unsigned types (such as ELEMENT_TYPE_U4) never appear anywhere in the verifier—they are always converted to their equivalent signed type. Naked ELEMENT_TYPE_I1/I2/Char/Boolean types cannot exist on the stack, in one embodiment. The verifier promotes small integral values to I4's when moving them onto the stack (for example, from local variables). However, it is possible to have a byref of one of these types (for example, a "&I2"). If the item is an object reference, or a byref object reference, the type component will be VER_ELEMENT_TYPE_OBJREF.

In addition to the type component (lower 6 bits of m_dwFlags), the flags as shown in the table of FIG. 4 reside in the upper bits of m_dwFlags. Some example flags are shown in the table of FIG. 5. There is a duality between some value classes and their primitive types, which can be disadvantageous. For example, a Microsoft/Runtime/Integer4 value class is really equivalent to an ELEMENT_TYPE_I4, even though the metadata signatures are different, and they have completely different representations in the verifier. Both forms can exist throughout the EE.

The verifier handles this issue by ensuring that at the lowest level, the CompatibleWith and Merge functions are aware of this duality. The rest of the verifier is not aware of the duality. Therefore the CompatibleWith function should be used to determine compatibility between two Items, rather than peeking at the contents of Items directly. In other words, instead of checking "Item.GetType( )=ELEMENT_TYPE_I4", create an Item2 which is an ELEMENT_TYPE_I4, and then call "Item.CompatibleWith(&Item2)". It is noted that the Item.GetType( ) helper function does not actually mask off and return the type component directly. If has an additional check—if the item is a byref, it returns ELEMENT_TYPE_BYREF instead.

Referring next to an EntryState, an EntryState is a variable size data structure, describing the machine state at a particular basic block. There is a fixed size portion, which is fixed when verifying a given method (but different for different methods), the size of which is determined by the number of local variables, which locals have fixed types and require only live/dead information, and whether this is a value class constructor. The variable size portion depends on the number of items on the stack. This tends to be zero most of the time (basic block boundaries tend to have an empty stack).

The layout for an entry state is shown in FIG. 6. The variable Verifier::m_StackItemOffset provides the offset at which the stack contents begin (i.e. the size of the fixed portion of the EntryState). Thus, the size of an EntryState is Verifier::m_StackItemOffset+sizeof(Item)*EntryState.m_

StackSlot. All locals which are primitive (i.e. have a negative slot number) have their liveness stored as a single bit in the primitive local variable liveness bitmap. All other locals (those with slot numbers>=0) have an Item allocated for them in the EntryState.

The EntryState structure is refcounted to conserve memory. Consider a situation where there is a 20-way switch statement (for simplicity, assume all destinations are unvisited). Rather than allocating 20 separate but identical EntryStates and attaching them to the destination basic blocks, the verifier instead allocates one EntryState, gives it a refcount of 20, and points the EntryState of each of the destination basic blocks at it. It is rare to ever have to re-store a new EntryState into a basic block, since basic blocks are almost never revisited for most code.

If for some reason one of these basic blocks, B, must be revisited in the future (due to a compatibility conflict), then the verifier will not modify the original EntryState, but will instead make a new copy and make B point to that instead. Refcounting occurs even for two way control flow (e.g. condition branches). Since it is quite rare to revisit a basic block, this is advantageous.

Revisiting

Revisiting is a quite rare occurrence. An example shows when it occurs:

```
A: Ldarg 0
   Ldc.i4 5
   Bne C
B: ldc.i4 99
   Stloc 3
   Push InputStream
   Goto X
C: Push OutputStream
   Goto X
X: Call Stream::SomeFunction( )
   Return
```

The verifier starts simulating at the beginning of A. At the end of A, when it sees the "Bne C" instruction, it queues basic block C for visiting with EntryState "stack={}", and falls through to execute the B case. At the end of B it notices X is unvisited, so it jumps to X, and stores "loc#3=live, stack={InputStream}" in X's EntryState. After the end of X, control flow ends, so it dequeues a basic block. Since C is the only basic block in the queue, C is dequeued (with a state of stack={}). At the end of "C", when the current state is "stack={OutputStream}", it notices that X is already visited, so it compares its current state with X's stored state (loc#3=live, stack={InputStream}}. The current state is clearly not a subset of X (for two reasons; OutputStream is not a subset of InputStream, and loc#3 dead is not a subset of loc#3 live). The two states are then merged, and the result, stack={Stream}, loc#3=dead, is stored in X's EntryState. X is then re-visited. It should be noted that if X was inside one or more try blocks, then all filters and handlers for those blocks would also have to be queued for revisiting, since the initial state of X has changed.

There can often be a ripple effect when revisiting basic blocks; if instead of a return instruction, execution proceeded from X into another basic block, Y, it is quite likely that the current state would not be a subset of the state originally stored for Y either (since Y's original state was probably derived from X's original state), so Y would then be revisited.

Exceptions

When inside a try block, in theory, execution could jump to the exception handler/filter at any time. Therefore the verifier must determine the most conservative values of the local variables and argument slots through all points in the try block. The contents of the stack are not tracked, since the stack is cleared if an exception causes execution to enter the exception handler.

Primitive and value class locals and arguments (e.g. I4's, I8's, etc.) have a fixed type, and effectively only one bit of state—either "live" or "dead". Moreover, they can never revert from "live" to "dead" status. For example, once you have stored a "72" into an integer local variable, it is impossible to revert that local to containing uninitialized data. Therefore, the state of all primitive and value class locals at the start of the exception handler/filter will be the same as at the beginning of the try block. Argument slots do not need to be tracked, because arguments are always live, and their type is always fixed. For example, if the method signature states argument #3 is a Stream, it is acceptable to store an InputStream (subclass) into that argument, but as far as the verifier is concerned, whenever you read argument #3, you will get back a Stream, not what you stored into it.

Thus, the verifier needs to track only polymorphic locals—in other words, locals which are object references or byref object references. For example, if local variable #5 is declared as type Object in the locals signature, contains an InputStream at the start of the try block, but has an OutputStream stored into it at some point inside the try block, the verifier must "and" together these constraints to determine a conservative type for local variable #5 at the start of the exception handler. In this situation, the closest common superclass of InputStream and OutputStream would be found (for example, "Stream"). To accomplish this, the verifier traps the "stloc" function, since that is the only instruction which can change the type of a polymorphic local variable.

If a local was uninitialized at the beginning of the try block, then it will be considered uninitialized (dead) in the handler. If verifying a value class constructor, the state of the field initialization status bitmap (indicating which fields of the value class have been initialized) at the beginning of the try block is propagated to the exception handler. It is illegal to have a try block around code where the "this" pointer is uninitialized, if "this" is an objref. The initialization status of "this" would be indeterminate inside the exception handler if this were allowed. In the value class case, the verifier will conservatively assume that "this" was uninitialized—it can do this, because it is allowable to construct a value class more than once, whereas it is illegal to construct an object reference more than once.

Byref

It is illegal to return a byref from a method if it was not a byref to something which had a permanent home (i.e. the Item in question had the "VER_FLAG_PERMANENT_HOME" flag set). Items which have permanent homes include static and instance fields of object references, and subfields of these fields (in the case where the container field is a value class). This relies upon the assumption that a byref to an object reference can prevent that object from being garbage collected. Everything else is considered to not have a permanent home. The addresses of local variables and stack slots are definitely not a permanent home.

Global/Local Types

All arguments and local variables have a global type, which is derived from the method signature and the locals signature respectively. It is illegal to store an incompatible type into a local or argument. For example, if a local is declared to be a String, it is illegal to store an InputStream into it. Generally, object locals will tend to be declared to be of type Object, to minimize the size of the signature, and to allow better signature pooling.

Arguments are not dynamically tracked. It is possible to store data into arguments, but reads from arguments always return the declared type. For example, if an argument is declared to be a Stream, it is possible to store an InputStream (subclass) into the argument. However, reading from the argument will always return a Stream.

Arguments therefore have only a global fixed type. Furthermore, they have no "current state" since they are always live. There is only one additional piece of information, which is whether the "this" pointer (argument slot #0) is initialized. The function Verifier::GetCurrentValueOfArgument( ) abstracts this away.

Local variables which contain primitive types or value classes also have only a global type. The only information stored for these is whether the local is live or dead (uninitialized), and this information is stored in a bitmap. Local variables which are not primitive types or value classes (e.g. object reference, or byrefs of primitive types or value classes) do NOT work this way, and their simulated type is fully tracked. These local variables therefore have a "current type" in addition to their "global type".

Each local variable is assigned a "slot". Primitive or value class locals are given negative slot numbers, −1, −2, −3, . . . , while all other locals are given positive slot numbers 0, 1, 2, . . . These numbers are independent; one local can have a slot −1 and another local can have a slot of +1. The negative slot numbers correspond to bits in the "local variable liveness bitmap"—here, a local will have a bit set if it is live, otherwise it is considered dead. Slot −1 corresponds to bit #0, slot −2 to bit #1, and so forth.

The macro LIVEDEAD_TRACKING_ONLY_FOR_SLOT( ) returns whether a given slot number indicates that only live/dead information is tracked for this local (all the macro does is return whether the slot number is negative). The macro LIVEDEAD_NEGATIVE_SLOT_TO_BITNUM( ) turns a negative slot number such as −3 into its corresponding bit number #2.

Locals which are stored in positive slot numbers have a full "Item" allocated for them, allowing complete type information to be stored (for example, whether the local is a byref of a local variable or instance field, is a pointer to something with a permanent home, etc.). This information is stored in the m_pNonPrimitiveLocArgs array, representing the current state of these locals. The function Verifier::GetCurrentValueOfLocal( ) abstracts away how the local information is stored, and simply returns an Item containing the current value of the local (which may be a "dead" type, if the local was dead).

There is also the concept of a "pinned type". If an object local variable has its address taken anywhere in the method (this is determined in the first pass over the code), its type is pinned to its globally declared type. There is a separate bitmap indicating which object locals have a pinned type. Pinned type is actually separate from the live/dead bitmap, even though it should probably not be. For EntryStates (states associated with basic blocks), information is stored in a similar array in the EntryState structure, as is a bitmap for all the locals for which only live/dead tracking is done.

Verifier Table

In order to simplify the code, the handling of a majority of instructions is handled via a table. For example, "add.i4" (a deprecated instruction, but a good example) has an operation string "44:4", meaning pop an I4, pop another I4, then push an I4. The typeless "add" instruction has the operation string "N=:−", where "N" means "pop a number" (I4/I8/R4/R8/I), "=" means "pop another item of the stack, and it must be the same type as the previously popped item", and "−" means backtrack the stack by one. The ":" is a delimiter to separate pushing and popping operations.

CompatibleWith

The Item::CompatibleWith function is an important function in the verifier, and returns whether one item is compatible with (i.e a subset of) another Item. The functionality of the item CompatibleWith is shown in FIG. 7, as can be appreciated by those of ordinary skill within the art.

Merge

The Item::MergeToCommonParent function is also an important function. However, it is not called very often—merging occurs only when the verifier needs to re-visit a basic block, because of a state mismatch, and that is a fairly rare situation. Merge takes two Items and finds the highest common factor. Unlike CompatibleWith( ), merging is symmetric; A merged with B provides the same result as B merged with A. Examples are shown in FIG. 8, as can be appreciated by those of ordinary skill within the art.

Dirty Basic Block List

The dirty basic block list is a bitmap, with one bit for each basic block. All basic blocks which need to be visited have a bit set. Initially the entire bitmap is zeroed, and bits are set as control flow instructions are seen on the second pass. All basic blocks which have a bit set must have an EntryState associated with them, so that the verifier can simulate the machine state at that point.

Constructors

The rules for verifying constructor methods are different for value class constructors and object constructors.

For object constructors, it must be verified that the method calls either its direct superclass constructor, or an alternate constructor in the same class. An exception to the rule is the constructor for Microsoft/Runtime/Object, which has no superclass to call, and therefore the object is considered fully constructed upon entry into the constructor. The initialization state of the "this" pointer is part of the verifier state, and it checks that "this" cannot be passed to other methods until it has been constructed. It also ensures that when the "ret" instruction is encountered, "this" is initialized. It is illegal to construct an object more than once. Therefore if there is a path merge and one path constructed "this" and the other did not, verification fails.

For value class constructors it must be verified that all fields of the value class are initialized explicitly. This is because value classes can be stack allocated, and are therefore not zero-initialized (unlike objects allocated from the garbage collection heap). The current implementation is intentionally lenient about this, and enforces this rule only if there are any fields containing object references or value classes which themselves contain object references.

If a value class itself has value class fields, it is more tricky to verify its constructor, since such fields are initialized by loading the address of the field onto the stack (ldflda), possibly some parameters, potentially followed by control flow, and eventually calling a constructor on the field. The verifier must track that the address of the field is tied to an instance field, and implicitly consider the instance field to have been initialized by the call to the field's constructor.

Sloppy IL Code

It is common to see a local variable declared as an I4, performing a "ldloca" to load its address onto the stack, and then performing an operation as if it were a Microsoft/Runtime/Boolean. This is illegal, since an "&I4" is on the stack, not an "&I1". The solution for code generators is to properly declare the local as an "I1" or "Microsoft/Runtime/Boolean".

In a constructor for a value class, code sometimes initializes some of the fields, then calls another instance method to initialize other fields (e.g. "this.count=GetCount( )"). In theory, "this" is not considered constructed until all fields have been written to, and therefore instance methods cannot be called on it until it is done. In practice, the verifier is intentionally lenient, and as long as there are no object references (including object references embedded in value class fields) in the value class, it allows it. Effectively, it is allowing garbage (uninitialized) values to exist in integer/float/etc. fields of value classes.

Specification of COM+ Run-Time Verification

In this section of the detailed description, a specification of a COM+ run-time verification that can be performed by a system or a method as previously described is provided. The description provided in this section is such that it is understandable to those of ordinary skill within the art. It is noted, however, that the invention itself is not limited to the details provided herein in this section.

Introduction to Verification

A file containing code for the COM+ Runtime may be transferred across a network to run in an Execution Engine hosted on a remote computer. The Execution Engine might be embedded in a web browser, for instance. The Execution Engine may or may not trust such mobile code to be safe to run. In the case that the mobile code is untrusted, the code is verified statically, that is, before it is allowed to run, to determine whether certain conditions hold. These conditions prevent execution errors such as the following:

type errors (such as confusing integers and pointers, or calling a method that does not exist);

access control errors (such as accessing a private field or method from outside its class);

object initialization errors (such as accessing a freshly created object before it has been appropriately initialized);

other errors such as stack overflows and references to local variables or arguments that do not exist.

Such execution errors could be exploited by untrusted mobile code to circumvent other security checks. In this way, untrusted mobile code could mount attacks on the host computer. The Execution Engine only runs untrusted code if it passes the checks performed during verification, which rule out these execution errors. Therefore, verification is an important mechanism for securing the COM+ Runtime when it runs untrusted code. Moreover, the verification checks may help to uncover code generation bugs in compilers that target the COM+ Runtime.

The verification task divides into two parts:

Metadata verification ensures that the classes and other items specified in a file make sense given the state of the Execution Engine which loads the file. Metadata verification is principally implemented by the class loader. It is performed when a file containing untrusted code is first loaded by the Execution Engine.

IL verification ensures type correctness of the IL instruction streams implementing each untrusted method. IL verification is implemented by the IL verifier. The Execution Engine invokes the IL verifier the first time it calls each untrusted method, and only executes the method if the IL verification succeeds.

The IL verifier is sometimes referred to simply as the verifier, which may be a source of confusion since its task is to perform just IL verification but not metadata verification. In fact, the verifier in one embodiment works on the assumption that metadata verification has been performed by other components of the Execution Engine. Both parts of the verification task in one embodiment are needed to avoid the execution errors mentioned above.

Metadata Verification

The purpose of metadata verification is to ensure that executable files received by the COM+ Runtime are well formed, that is, have the structure expected by the Runtime, and that the classes and other items they specify make sense in the environment into which they are loaded. This helps ensure that later processing of the items through IL verification, building method tables, interpretation, JITting (viz., just-in-time compiling), marshalling and so on, as known within the art, will not cause the COM+ Runtime to crash or behave in an insecure fashion. Many of the conditions checked by the verifier are simple structural conditions relating to the Execution Engine (EE) file format; however, some modestly complex checks are required to ensure the integrity of the data typing environment of the EE and to ensure the correctness of various execution and layout strategies. Thus, metadata verification refers to various structural conditions and wellformedness conditions, as is now described. Metadata itself thus refers to structure and wellformedness of the IL code.

Metadata: Structural Conditions

The COM+ Runtime should never crash when attempting to load and/or run an untrusted executable, no matter how badly the executable is formatted. The COM+ Runtime can make no assumptions that untrusted executables will be in the format specified in other COM+ Runtime documents, or that they will have been generated by tools like assem or a compiler for a high-level language. Therefore, the first set of checks to be performed simply ensure that the structural format of the data being read is valid. The COM+ loader must fail gracefully if these checks are not satisfied.

Metadata: Wellformedness Conditions for Metadata

The structural validity of a module is not sufficient to ensure that it is acceptable to load into the system. For example, modules that specify circular class hierarchies are not admissible, and untrusted modules must be checked for such properties. Only metadata that influences the behavior of the COM+ Runtime needs to be verified. Examples include the class and interface hierarchy, which determines what is a subtype of what.

Metadata Wellformedness: Resolution of Refs to Defs

Whenever type, member, or other "ref" (reference) tokens are encountered during either metadata or IL verification, they should successfully resolve to a unique "def" (definition). The "def" returned by resolution should be invariant after the first resolution of a "ref", e.g., further loading of classes should not alter the behavior of the resolution process. In principle, the COM+ Runtime might check the resolvability of refs and defs at any stage during the loading process, but in practice it happens "on-demand", i.e., as late in the loading process as possible.

Resolving a type reference might cause the class loader to be invoked recursively, which might, in turn, cause the metadata and IL verification algorithms to be invoked recursively. Mutually referential modules can be loaded and verified because the loading process performs a graph walk through the referential structure.

Metadata Wellformedness: Type Definitions

For each type definition, i.e., each mdtTypeDef metadata item, conditions such as the following are checked:

The name of the type definition is unique within its namespace.

The type is marked as an interface, value class, enumeration, or class. At present, this means at most one of tdInterface, tdValueClass and tdEnum can be set, although the exact encoding of this data might change.

If the type is a class, then:

All of its associated superclass, method, field, property, event, and "implemented interface" tokens resolve to metadata items of the correct kinds.

It extends some type, which must be a class. If the type is Microsoft/Runtime/Object it must not extend anything.

No circularity in the class hierarchy is induced.

The superclass is not final.

If any of the exposed methods of a class are abstract, then the class itself is abstract. The exposed methods are any public or protected methods defined in the class, or inherited from a superclass ans not overridden by a method within the class.

It implements a set of types, each of which must be an interface. Furthermore, the exposed methods of the class must include the methods necessary to implement the interfaces, depending on the kind of the implementation relationship (itImplements, itEvents, itRequires, itInherits) for each interface.

If the type is an interface, then:

All of its associated method and interface tokens resolve to metadata items of the correct kinds.

It does not extend anything, but has an inheritance relation with zero or more types, each of which is an interface.

No circularity in the interface hierarchy is induced.

It is not final or abstract, has no non-static fields, and all its methods are public, virtual and abstract.

It contains no constructors

If the type is a value class, then:

See the Value class documentation for the list of constraints, e.g. the class must be derived directly from Microsoft.Runtime.Value, be immutable, be final, and so on.

If the type is an enumeration, then:

It only has static final values.

The type may have any kind of layout (automatic, sequential or explicit), however if explicit then the layout must not specify overlapping fields.

Metadata Wellformedness: Field Definitions in Types

For each field within a type, i.e., each associated mdtFieldDef metadata item, conditions such as the following are checked:

Taken together, the name and signature of the field must be unique within the type.

It must be one of private, protected, public or package, as known within the art.

It must have calling convention "field."

Metadata Wellformedness: Method Definitions in Types

For each method within a type, i.e., each associated mdtMethodDef metadata item, conditions such as the following are checked:

The name/signature is unique within the type.

Its access rights must be one of private, protected, public or package.

It is static, virtual, abstract-virtual or none of these, and its calling convention not field.

If the method overrides a method in a superclass or interface (i.e., a non-private virtual method exists with the same name/signature as a new virtual method) then the overridden method is not final. From the perspective of EE type system, non-virtual methods are not considered to override virtual methods, and vice-versa: this is a source language choice.

The method has an implementation if and only if it is not abstract

If the method has an implementation, then that implementation is managed, non-optimized IL The return type is not RefAny. It may be ByRef(T) but the IL verifier checks that only certain ByRefs are returned.

No argument or local has type ByRef(ByRef(T)) or ByRef(RefAny).

In addition, constructors must have return type void, must not be virtual or abstract.

Metadata Wellformedness: Events

For each event within a type, the following conditions are checked:

The name is unique within the type.

It has an Add method for the event name and that method takes a delegate type T and returns void.

It has a Remove method that takes the same delegate type T and returns void.

Optionally, it has a Raise method that takes an arbitrary set of parameters and returns void.

The Add and Remove methods must have the same accessibility (public, protected, . . . ). There is no restriction on the Raise method's accessibility.

The delegate type T must have a void return type and be multicast. There are no other restrictions on the delegate's shape, including what parameters it takes and what exceptions it throws.

Metadata Wellformedness: Global Methods

For each global function, conditions such as the following are checked:

The function must be neither abstract nor virtual and must be static.

The function must have an implementation that satisfies the following requirements:

It is managed, non-optimized IL

IL Verification

The purpose of IL verification is to guarantee that the IL code in an untrusted method is safe to execute, that is, that it will not give rise to certain unsafe execution errors including type errors, access control errors, and object initialization errors. In principle, the Execution Engine could avoid such execution errors by performing dynamic checks during the course of executing the untrusted method. However, this would degrade execution speed. Instead, the IL verifier according to one embodiment of the invention performs static checks to guarantee the absence of unsafe execution errors during execution of the untrusted method. These checks are static in the sense that they are performed before execution of the method begins. If IL verification succeeds, the verifier allows the method to execute. If IL verification fails, the method call fails, and the verifier raises the exception Microsoft.Runtime.VerifierException.

The IL verifier makes two passes over the method:

In the first pass, the verifier performs syntactic checks to ensure that the byte codes of the method can be parsed as a valid sequence of IL instructions. Every instruction in the method is visited during this pass.

In the second pass, the verifier performs semantic checks to ensure that no execution path can lead to one of the execution errors described above. In this pass, the verifier performs a symbolic execution of the method, in which actual values are simulated by their types. Only instructions that are reachable by some execution path are visited during this pass.

IL verification succeeds if and only if both the syntactic and semantic checks succeed.

IL Verification: Types

"Types" from the point of view of verification are not the same as the "datatypes" described in the COM+ Execution Engine Architecture description provided below. The typing scheme described in the COM+ EE Architecture deals only with basic types such as I1, I, O, & and so on: this typing scheme should always be obeyed, even by trusted code, since the correct operation of the (just-in-time compiler) JIT depends on it.

Verification types are more specific than these. In particular O and & types include more information, that is, which class, array or interface is being referred to by a reference, and which type is being referred to by a ByRef. Further, VC(td) is used to indicate a type definition that is being used as an (unboxed) value class. Note that like the EE, the verifier draws no distinction between signed and unsigned types. The different types that appear at different places during verification are summarized in the table of FIG. 9(a) and FIG. 9(b). Note that the EE data type "*" does not arise during verification. Furthermore, the legend to be used in the table of FIG. (a) and FIG. 9(b) is as follows:

M9: no, but possible

X: Yes

B: A "ret" instruction should return a result of type &*(ty) if the method is declared to return an &(ty); it may not return an &(ty); in the calling method, the value resulting from the call then has type &(ty)(and not &*(ty))

C: What is done with values classes on the stack is to pass them to a method that is expecting a value class as a parameter, duplicate them or pop them off VC(I1): VC(Microsoft/Runtime/SignedByte)

VC(U1): VC(Microsoft/Runtime/Byte), etc.

VC(R4): VC(Microsoft/Runtime/Single)

VC(R8): VC(Microsoft/Runtime/Double)

Certain types arise during verification that are not allowed in method or field signatures. The main purpose of these is to track special situations concerning the initialization of locals and the correct behavior of constructors. These special situations are described next.

IL Type Verification: Uninitialized Locals

Uninitialized locals occur when the ZeroInit flag is false. Addresses to uninitialized value classes must be placed on the stack and appropriate constructors called, by using ldarga. &Uninit(n,ty) indicates a byref-pointer to a local variable containing a value class that is about to be initialized. Special types for verifying the correct use of uninitialized locals are shown in FIG. 10.

IL Type Verification: Constructors Must Construct

The special type UnconThis is used as the type of the uninitialized class instance that gets passed to non-value class constructor methods. In particular, argument 0 of such constructors is initially given this type. After the constructor calls its superclass constructor, or a constructor of the same class, argument 0 assumes the type O(td), where td is the constructor's class. To ensure that the object has in fact been constructed, returning from a constructor is only allowed if argument 0 no longer has the type UnconThis. A summary of this type is shown in FIG. 11.

IL Type Verification: Value Class Fields Must be Initialized

For value class constructors, the construction may be delegated as before, but if not then every field of the value class object must be initialized before the constructor returns (regular objects have all their fields zero-initialized, but for value classes, which are allocated on the stack, there is no such guarantee). Thus, an initialization flag is kept for each field in the object. The object is considered constructed when all of these flags are set, at which point argument 0 assumes the type &(VC(td)), where td is the constructor's class. This is summarized in FIG. 12.

IL Type Verification: Only Special Byref's May be Returned

Byrefs that can be verified to be pointing into the heap, or to static data, or to any such "home" that will still exist after the current method exits (e.g. those passed in as arguments to the method), may be returned from a method. Byrefs which are known to have this property are marked &*(ty). This is summarized in FIG. 13.

IL Type Verification: Compatibility for Types

Figure 14:
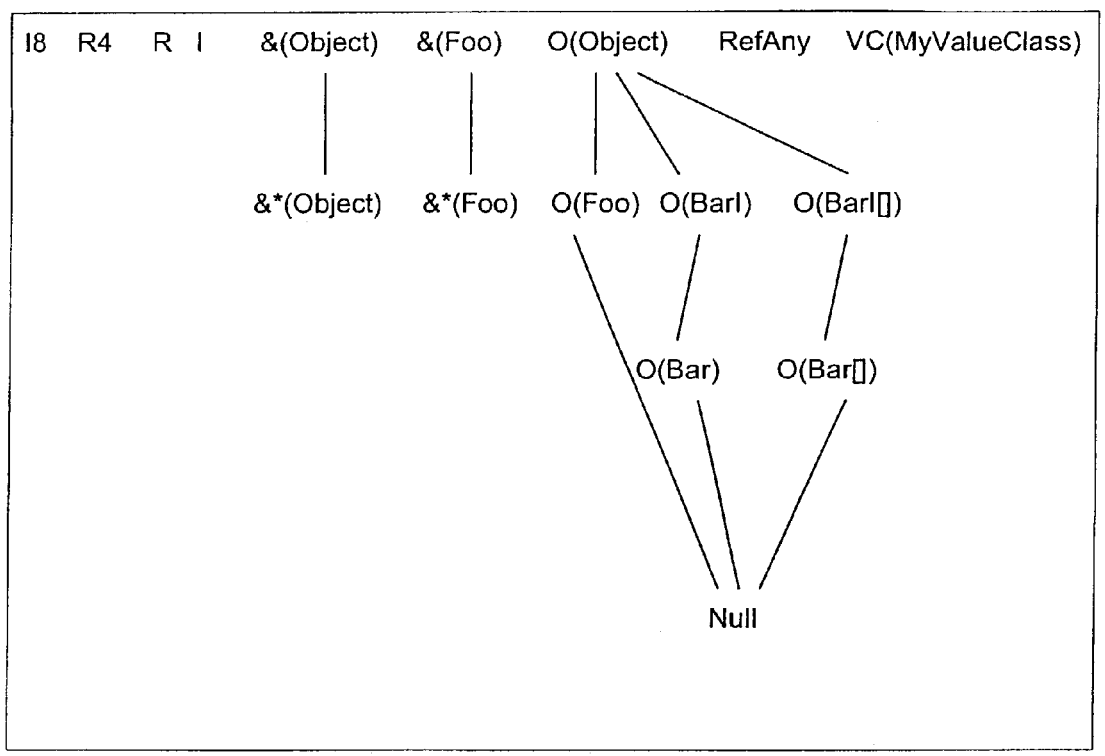
FIG. 14 is a diagram showing an example illustrating the IL type verification of compatibility for types according to an embodiment of the invention.

The compatibility relation for verification types (<:) is shown by example in FIG. 14. The diagram of FIG. 14 assumes class Bar implements interface BarI. Any types not shown do not exhibit any compatibility with other types.

IL Verification: Input to the Verifier

The Execution Engine provides the verifier with the following information about the method to be verified. (This information comes from the methoddef metadata item and the ILMethod metadata item for the method.) From the methoddef item comes the input:

The signature, including the number of fixed arguments, NumArgs

Whether the method is static, virtual, or neither.

Whether the method is public, protected, or private.

Whether the method is a constructor.

Whether the method is a class constructor.

Furthermore, from the ILMethod item comes the input:

The maximum height of the stack, referred to as MaxStack.

The tailsig that specifies the number (NumLocals) and types of local variables.

An array of bytes, referred to as codes, and its length.

An array of exception clauses, where an exception clause specifies Start, End, Handler and Finally offsets and either a Filter offset or a ClassToken.

The ZeroInit flag for the method

The verifier also depends on metadata information from the COM+ Runtime environment. In particular, it depends on the method and field signatures of all members accessed from the method, as can be appreciated by those of ordinary skill within the art.

IL Verification First Pass (Syntactic Checks)

The syntactic checks determine whether the codes array consists of a well formed sequence of IL instructions. The syntactic checks apply to every IL instruction parsed from the codes array, whether or not there is an execution path that reaches it. The syntactic checks are as follows:

The length of the codes array is greater than 0.

The codes array can be parsed into an array of IL instructions according to the rules in the "IL Opcode Encoding"

specification, such that the last byte of the last parsed IL instruction is the last byte of the codes array The target of each branch or leave instruction lies within the codes array at the start of a parsed IL instruction. Each target of each switch instruction lies within the codes array, and at the start of a parsed IL instruction.

For every tailcall instruction, the following instruction must be a call or callvirt and there must be no branches directly to the following instruction, and no exception handler can specify the following instruction as a target (i.e. tailcall must be a true annotation, and it must be possible to treat the tailcall/call/callvirt instructions as an atomic instruction).

IL Verification Second Pass (Semantic Checks)

The IL verifier performs the semantic checks by simulating the effect of executing the instructions in the method. The types of values that are tracked may be assumed by the arguments, stack slots, and local variables over the course of any execution path through the method, and check that no instruction can give rise to a type error. The definitions shown in FIG. 15 are used to specify the semantic checks.

IL Verification Second Pass (Semantic Checks): Type States

A type state records constraints on the types of arguments, locals and stack slots.

A type state contains:

args. An array of types, one for each argument to the method. (The type of each argument is fixed throughout the method, except that in a constructor, argument 0 starts as the type UnconThis, but after initialization it becomes either &(VC(this)) for a value class this constructor, or O(this) for a class this that is not a value class.)

locals. An array of types, one of each for each local variable. (The type of local i may vary, unless there is a ldloca i anywhere in the method.)

stack. An array of types indicating the current state of the argument stack.

fields. Flags used to indicate which fields a value class constructor has initialized.

block. Flags recording if were in a regular, finally, filter or handler block.

tailcall-ok. Flag recording whether it is safe to perform a tailcall. It is safe to perform a tailcall if no addresses of locals or arguments have been taken.

A summary of operations on type states is shown in the table of FIG. 16.

IL Verification Second Pass (Semantic Checks): The Basic Verification Algorithm

In one embodiment, the semantic checks can be expressed as an algorithm, which acts on the following state.

The Pending Nodes in the Dataflow Analysis: a set of pairs (i, state), where i is an address, and state is a type state. This set stores those locations still to be explored in the data flow analysis of the method. Note that locations may be revisited with refined type states.

The Visited Nodes in the Dataflow Analysis: as addresses are analyzed, the results of the analysis are recorded, and thus each address is either unmarked, or marked with a type state.

In one embodiment, the algorithm is as follows:

1. Initialize Pending to be the singleton set {(0, state0)} where state0 has
args=
[arg1', . . . , argn'] if the method is static, with
[UnconThis, arg1', . . . , argn'] if the method is a constructor.
[O(td), arg1', . . . , argn'] otherwise Here the signature of the method is class::method (arg1, . . . , argn) with argi' being argi with &(ty) types replaced by &*(ty).
locals =
[loc1, . . . , locn] if the ZeroInit flag is true.
[Uninit(loc1), . . . , Uninit(locn)] if the ZeroInit flag is false.
Here the tailsig of the method is [loc1, . . . , locn]
stack=[]
fields=
[false, . . . , false] if verifying a value class constructor, one for each field.
undefined otherwise
block=regular
tailcall-ok=true 2. If Pending is the empty set, halt with success.
3. Choose a pair (i, state) from the set Pending, and remove it from the set.
4. If the address i is marked with the state old:
If the least upper bound old ∪ state exists, then:
If old ∪ state equals old, goto 2.
Otherwise, unmark the address i, insert (i, old ∪ state) into Pending, and goto 2.
Otherwise, halt with failure.
5. If the address i is unmarked:
Mark the address i with the state state.
Let inst be the IL instruction whose first byte is at address i.
The effect an instruction has on the type state as has been defined. If any of the checks described there fail, then halt with failure. Otherwise, let state' be the outcome of running inst on state.
If the length of the stack component of state' is greater than MaxStack, halt with failure.
Insert one element (j,state') into Pending for each destination address j specified in the detailed description below. In addition, for each exception clause with Start, End, Handler, and Finally offsets, where Start<=i<=End, and a class token Class, we insert (Handler, state") and (Finally, state") into Pending, where state" is state' with the stack set to [Class]. If the exception clause has a Filter offset, then insert (Filter, state") where state" is state' with the stack set to [Microsoft/Runtime/Object]
Goto 2.

The algorithm terminates because the number of elements in the state never exceeds the total number of instructions in the method, and on each iteration the type state for at least one instruction is increased according to the <: ordering, and this ordering is finite.

IL Verification Second Pass (Semantic Checks): Effect of an Instruction on Control Flow The destination addresses of an instruction are as specified in the table of FIG. 17, where next is the subsequent instruction. For instructions not appearing in the table, the destination address is simply next. Here k indicates the address referred to by the offset in the instruction.

IL Verification Second Pass (Semantic Checks): Effect of an Instruction on Type State In this section, the effect of each instruction has on the type state is described. Each instruction is regarded as transforming a given type state into another, which is referred to as the outcome of running the instruction. Almost all of the instructions only affect the stack, and have no effect on the arguments and locals. Unless otherwise stated, the stack is the only component of the state that changes.

If the stack typing for an instruction is defined in FIGS. 18, 19(a), 19(b) and 20 as [ty1, ..., tyn] ⇒pushes, then the effect of an instruction is only defined if stack has shape stack=base+[pop1, ..., popn], and popi<: tyi for 1<=i<=n. That is, [ty1, ..., tyn] specifies a series of constraints that must be satisfied up to subtyping. The new stack is base+pushes. That is, pushes specifies exact types rather than types up to subtyping.

The effect of various control flow instructions on the type state is shown in the table of FIG. 18. The effect of various basic instructions on the type state is shown in the table of FIG. 19(a) and FIG. 19(b). The effect of various object model instructions, excluding methods and fields, is shown in the table of FIG. 20.

For method call instructions, each of the following cases assumes md resolves to a method with signature rty T::method (x1, ..., xn) where rty is the return type. In each case, if md has protection protected then it must be this<: T, where this is the type containing the method being verified. Similarly, if md has protection private then this=T. Thus, the effect of various method call instructions, with these assumptions in mind, is shown in the table of FIGS. 21(a) and 21(b).

For field instructions, each of the following cases assume fd resolves to a field with signature fty T::field. In each case, if fd has protection protected then it must be this <: T, where this is the type containing the method being verified. Similarly, if fd has protection private then it must be this=T. Thus, the effect of various field instructions, with these assumptions in mind, is shown in the table of FIG. 22.

Generating Verifiable Code: Verifiability and Optimizations

As can be appreciated by those of ordinary skill within the art, verifiability substantially limits the kind of code optimizations that may be used at compile time. This is because the responsibility for ensuring type soundness is shifted from the compiler to the verifier/JIT. Only optimizations where type soundness remains manifest in the code produced can be used when generating verifiable code. Optimizations such as loop unrolling are acceptable, because the code produced has essentially the same type structure as the original.

For example, if a compiler inlines across protection boundaries, then code may no longer be verifiable. Consider
   class A {
      public: void add( ) {x=x+1; }
      private. int x;
   }
   class B {int main( ... ) { ... A a; a.add( ); ... }

Many compilers would inline the a.add( ) call. However, to produce verifiable code, the compiler should not do this. This is because moving x=x+1 into class B would mean a method in B was directly accessing a private field of A.

Similarly, optimizations such as the aggressive reuse of stack, local and variable slots should either not be used, or in the case of Opt-IL annotations, will be rejected or ignored for untrusted code.

Generating Verifiable Code: Verifiability and-COM+ IL Features

This section gives a description of the features in the verifiable subset of IL and explains how they should be used in order to ensure the code produced by a compiler is verifiable. The basic rules for generating verifiable code are as follows:

The metadata, i.e., classes, interfaces, arrays, value classes, and other items defined in a module must satisfy the constraints of the Virtual Object System, i.e., they must make sense according to the rules of this system. The rules are fairly obvious, and the system will simply refuse to load classes that violate them (though these checks may not be fully implemented in the alpha), so most code generators will not be bothered by this.

Stack slots have types, and data manipulations involving the stack must respect these types. A simple inference process can check and reconstruct the basic JIT/EE datatypes of stack slots. Verification goes beyond this and verifies the correct use of Object reference types.

Argument slots have similar behavior to stack slots. The types of these slots may not change: they are always constrained to the type specified in the method signature. You may store a compatible type into the slot, but when you retrieve it the item on the stack will be considered to have the declared type.

Local slots are similar to argument slots, however the types of these slots may change, though their IL datatypes may not (verification types are more specific than IL datatypes). That is, a local initially holding a reference to a String can be later used to hold a reference to some other kind of object, but a slot used to hold an I cannot later hold an I8.

Initialization of locals. Argument slots are initially "live", local slots are "uninitialized" (unless the ZeroInit flag for a method is set). Uninitialized slots must be initialized, either by performing appropriate stloc's or calling appropriate value-class constructor methods.

ValueClasses are relatively simple to verify: just remember that they act like base types. Value Class Constructors must initialize every field of the value class—the fields are initially uninitialized. Uninitialized fields cannot be used for any purpose except to take their address for initialization or to store into.

Branches must be to instructions within the same method. Moreover the types of the slots (locals, arguments, stack) must "match up" between the source and the destination. This means there must exist types such that (a) the assumptions encoded by those types are strong enough to ensure the code at the destination can be verified, and (b) the assumptions are weak enough that all control-transfers to that location guarantee they will be met.

Byref and Refany values are designed as a safe way to do some pointer access without using the object model. Byref and Refany types can only be used in a highly stylized way. Although they can point either into the heap or the stack, Byref values themselves always reside on the stack, and verification ensures we always know exactly where they live (garbage collection also needs to know this). They may only be returned from functions if the verifier can determine that the byref points into the heap. The most immediate use for compilers is to implement call-by-reference semantics for languages such as VB and Modula-2, and also to perform manipulations on value classes. Byrefs mean that many instructions that may appear "dangerous" are in fact verifiable when they use or produce arguments of this kind. In particular instructions that load addresses (ldloca, Idarga, ldflda, ldsflda etc.) are all verifiable, as are ldind and stind.

Taking the Address of Locals. Byrefs allow code to take the address of locals using ldloca. This includes locations whose type may, in theory, change, by a later assignment, e.g. object references. The verifier disallows this. If a ldloca is ever done on a local slot, anywhere within a method, then the type of that slot is constrained to its declared type (in the local signature) precisely as if it were an argument slot.

Access control (public, private, etc.) must be respected according to the rules of the VOS.

Constructors must not use the "this" pointer until they either call another constructor in their class or call a constructor of their superclass. Constructors must call such a constructor at some point before returning.

Exceptions require special care. The exception handling tables for a method specifies a series of possible control transfers, and each of these must satisfy the conditions for branching specified above.

COM+ Execution Engine Architecture

In this section of the detailed description, the architecture of a COM+ execution engine, which can be a part of a system as previously described, is presented. In particular, the architecture is described insofar and such that the verification aspects of embodiments of the invention already described are understandable to those of ordinary skill within the art. Thus, the description provided in this section is such that it is understandable to those of ordinary skill within the art. It is noted, however, that the invention itself is not limited to the details provided herein in this section.

Execution Engine Overview

The Execution Engine (EE) that manages the execution of source code compiled into Intermediate Language (IL), OptIL, or native machine code. All code based on COM+ IL executes as managed code, that is code that runs under a "contract of cooperation". The environment in which the EE operates is referred to as the COM+ Runtime environment, or simply COM+ Runtime.

A feature of the Execution Engine is its ability to provide software isolation of programs running within a single address space. It does this by enforcing typesafe access to all areas of memory when running typesafe managed code. Some compilers generate IL that is not only typesafe but whose typesafety can be proven by simply examining the IL. This process, verification, allows servers to quickly examine user programs written in IL and only run those that it can demonstrate will not make unsafe memory references. This independent verification is critical to truly scalable servers that execute user-defined programs (scripts).

The EE provides the following services:

Code management
Software memory isolation
Verification of the typesafety of IL
Conversion of IL to native code
Loading and execution of managed code (IL or native)
Accessing metadata (enhanced type information)
Managing memory for managed objects
Insertion and execution of security checks
Handling exceptions, including cross-language exceptions
Interoperation between COM+ objects and legacy COM objects
Automation of object layout for late binding
Supporting developer services (profiling, debugging, etc.)

The EE supplies the common infrastructure that allows tools and programming languages to benefit from cross-language integration.

One function of the EE is on-the-fly conversion of IL (or OptIL) to native code. Source code compilers generate IL (or OptIL), and JIT compilers convert the IL to native code for specific machine architectures. As long as a simple set of rules are followed by the IL generator, the same IL code will run on any architecture that supports the COM+ Runtime. Because the conversion from IL to native code occurs on the target machine, the native code can take advantage of hardware-specific optimizations. Other significant EE functions include class loading, verification, and support for security checks.

EE Overview: IL and OptIL

IL is a stack-based set of instructions designed to be easily generated from source code by compilers and other tools. Several kinds of instructions are provided, including instructions for arithmetic and logical operations, control flow, direct memory access, exception handling, and method invocation. There is also a set of IL instructions for implementing object-oriented programming constructs such as virtual method calls, field access, array access, and object allocation and initialization.

The IL instruction set can be directly interpreted by tracking the data types on the stack and emulating the IL instructions. It can also be converted efficiently into native code. The design of IL allows this process to produce optimized native code at reasonable cost. The design of IL allows programs that are not typesafe to be expressed, since this is essential for support of some common programming languages. At the same time, by following a simple set of rules, it is possible to generate IL programs that are not only typesafe but can easily be proven to be so.

EE Overview: Class Loading

The EE's class loader loads the implementation of a class into memory, checks that it is consistent with assumption made about it by other previously loaded classes, and prepares it for execution. To accomplish this task, the class loader ensures that certain information is known, including the amount and the shape of the space that instances of the type require. In addition, the class loader determines whether references made by the loaded type are available at runtime and whether references to the loaded type are consistent.

The class loader checks for certain consistency requirements that are vital to the COM+ security enforcement mechanism. These checks constitute a minimal, mandatory, verification process that precedes the IL verification, which is more rigorous (and optional). In addition, the class loader supports security enforcement by providing some of the credentials required for validating code identity.

EE Overview: Verification

Typesafe programs reference only memory that has been allocated for their use, and they access objects only through their public interfaces. These two restrictions allow objects to safely share a single address space, and they guarantee that security checks provided by the objects' interfaces are not circumvented. Code access security, the COM+ Runtime's security mechanism, can effectively protect code from unauthorized access only if there is a way to verify that the code is typesafe.

To meet this need, the COM+ Runtime provides a verifier, which uses the information in type signatures to help determine whether IL code is typesafe. It checks to see that metadata is well-formed, and it performs control flow analyses to ensure that certain syntactic and semantic conditions are met. The verifier declares that a program is successfully verified only if it is typesafe.

Used in conjunction with the strong typing of metadata and IL, verification can ensure the typesafety of programs written in IL. The COM+ Runtime requires code to be verified before it is run, unless a specific (administratively controlled) security check determines that the code can be fully trusted.

EE Overview: Security Checks

The EE is involved in many aspects of the COM+ Runtime's security mechanism. In addition to the verification process required by code access security, the EE provides support that enables both declarative and imperative security checks to occur.

Declarative security checks take place automatically whenever a method is called. The permissions that are required in order to access the method are stored in the component's metadata. At run time, calls to methods that are marked as requiring specific permissions are intercepted to determine whether callers have the required permissions. A stack walk is sometimes necessary to determine whether each caller in the call chain also has the required permissions.

Imperative security checks occur when special security functions are invoked from within the code being protected. The EE supports this type of security check by providing trusted methods that enable code identity to be determined and allow permissions to be located and stored in the stack. In addition, the EE gives the security engine access to administrative information about security requirements.

Virtual Execution System

Figure 23:
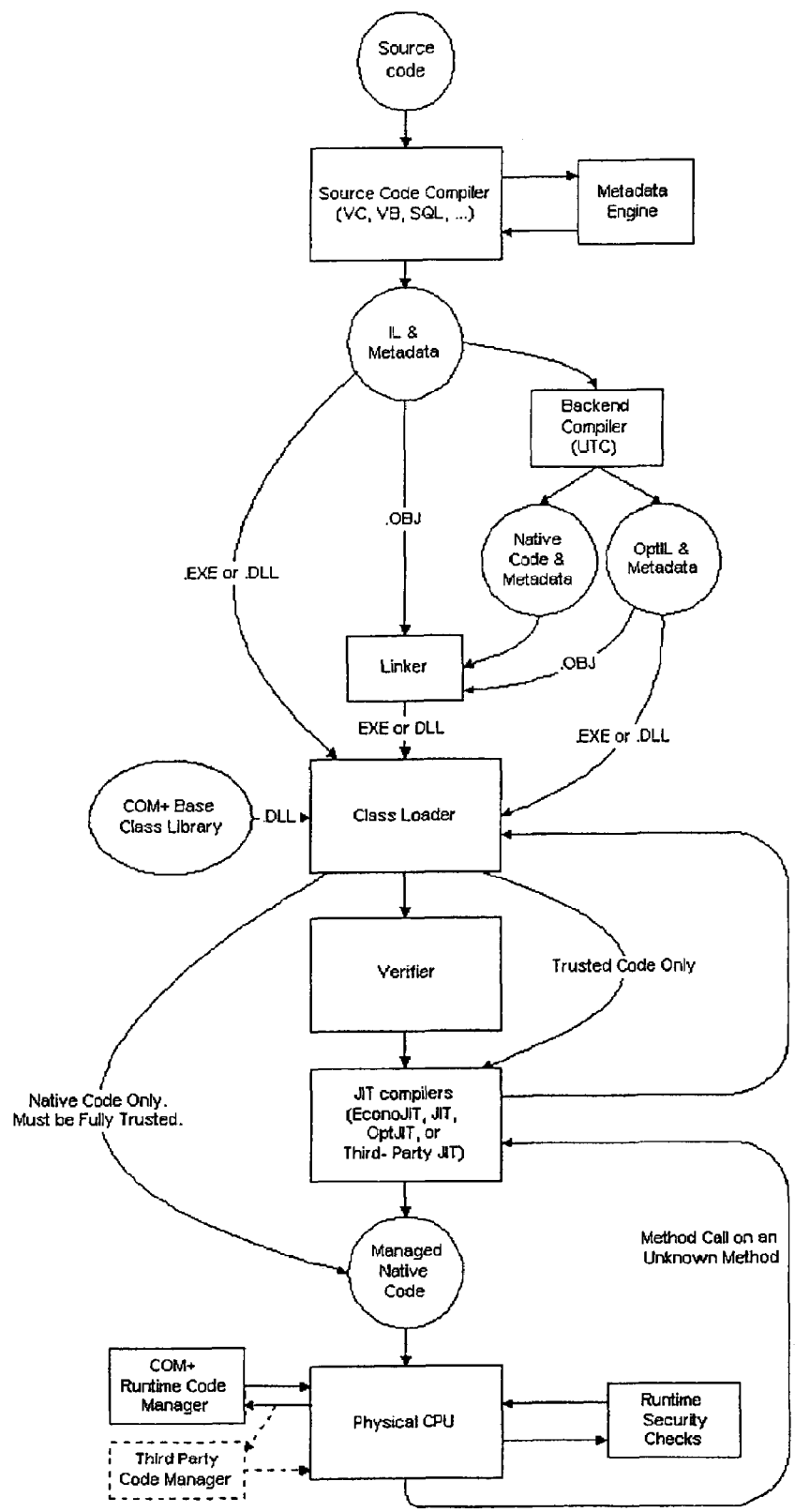
FIG. 23 is a diagram of a virtual execution system according to an embodiment of the invention.

The Execution Engine creates an environment for code execution called the Virtual Execution System, which is shown in FIG. 23. In most cases, source code is compiled into IL, and the IL is loaded and executed on-the-fly using one of the JIT compilers to convert the IL to native code. Note that for trusted code, verification can be omitted.

The EE's metadata engine enables the source code compiler to place metadata in the PE file along with the generated IL or OptIL. During loading and execution, this metadata provides information needed for registration, debugging, memory management, and security. Also indicated in the diagram is the fact that classes from the COM+ Base Class Library can be loaded by the class loader along with IL, OptIL, or native code.

Another execution path that can be chosen involves precompilation to native code using a backend compiler. This option might be chosen if compiling code at run-time is unacceptable due to performance requirements. As indicated in the diagram, precompiled native code bypasses verification and JIT compilation. Because precompiled native code is not verified, it must be considered fully trusted code in order to execute.

Supported Data Types

The Execution Engine directly supports the data types shown in the table of FIG. 24. These data types can be implemented using the IL instruction set. However, only the data types I4, I8, I, and R are supported by all numeric instructions. Instead, the support for the short values (I1, I2, R4, U1, and U2) is largely handled by conversion to wider values. This reflects a computer model that assumes static locations are 1, 2, 4, or 8 bytes wide but registers and stack locations are either 4 or 8 bytes wide. The support for short values consists of:

Load and store instructions to/from memory: ldelem, ldind, stind, stelem

Arithmetic with overflow detection: add.ovf, mul.ovf, sub.ovf

Data conversion: conv, conv.ovf

Loading constants: ldc

Array creation: newarr

The signed integer (I1, I2, I4, I8, and I) and unsigned integer (U1, U2, U4, U8, and U) types differ only in the how the bits of the integer are interpreted. For those operations where an unsigned integer is treated differently from a signed integer (e.g. comparisons or arithmetic with overflow) there are separate instructions for treating an integer as unsigned (e.g. cgt.un and add.ovf.u).

This instruction set design simplifies JIT compilers and interpreters of IL by allowing them to internally track a smaller number of data types.

Supported Data Types: Natural Size: I, R, U, O and &

The natural size types (I, R, U, O, and &) are a mechanism in the EE for deferring the choice of a value's size. These data types have a fixed but unknown size when the IL is generated at compile time. Instead, the choice of size is deferred until JIT compilation, when the EE has been initialized and the architecture is known. This implies that field and stack frame offsets are also not known at compile time. For languages like Java and Visual Basic, where field offsets are not computed early anyway, this is not a hardship. In languages like C or C++, a conservative assumption that they occupy 8 bytes is sometimes acceptable.

Supported Data Types: Unmanaged Pointers as Type U

For languages like C, where the size of a pointer is known at compile time and there are no managed objects, the fixed-size unsigned integer types (U4 or U8) can serve as pointers. However making the choice of pointer size at compile time has its disadvantages. If pointers were chosen to be 32 bit quantities at compile time, the code would be restricted to 4gig of address space, even if it were run on a 64 bit machine. Moreover, a 64 bit EE would need to take special care so those pointers passed back to 32-bit code could always fit in 32 bits. If pointers were chosen at compile time to be 64 bits, the code could be run on a 32 bit machine, but pointers in every data structure would be twice as large as necessary on that EE.

It is desirable, especially when building reusable library routines, to defer the choice of pointer size from compile time to EE initialization time. In that way, the same compiled code can handle large address spaces for those applications that need them, while also being able to reap the size benefit of 32 bit pointers for those applications that do not need a large address space.

For these reasons, the U type should be used to represent unmanaged pointers.

Supported Data Types: Managed Pointer Types: O and &

The O datatype represents an object reference that is managed by the COM+ runtime. As such, the number of legal operations is severely limited. In particular, references can only be used on operations that indicate that they operate on reference types (e.g. ceq and ldind.ref), or on operations whose metadata indicates that references are allowed (e.g. call, ldsfld, and stfld).

The & datatype (managed pointer) is similar to the O type, but allows pointers to the interior of an object. That is, a managed pointer is allowed to contain the address of a particular field within an object rather than to the whole object. Managed pointers must be reported to the COM+ runtime memory manager (as must object references).

Supported Data Types: Portability: Storing Pointers in Memory

Several instructions, including calli, cpblk, initblk, ldind.*, and stind.*, expect an address on the top of the stack. If this address is derived from a pointer stored in memory, there is an important portability consideration.

1. Code that stores pointers in a natural sized integer or pointer location (types I, O, U, or &) is always fully portable.
2. Code that stores pointers in an 8 byte integer (type I8 or U8) can be portable. But this requires that a conv.ovf.u instruction be used to convert the pointer from its memory format before its use as a pointer. This may cause a runtime exception if run on a 32-bit machine.
3. Code that uses any smaller integer type to store a pointer in memory (I1, U1, I2, U2, I4, U4) is never portable, even though the use of a U4 or I4 will work correctly on a 32-bit machine.

Supported Data Types: Handling of Floating Point Data Types

The Execution Engine assumes floating-point calculations are handled as described in the IEEE 754 standard, "IEEE Standard for Binary Floating-point Arithmetic," known within the art. This standard describes encoding of floating point numbers, definitions of the basic operations and conversion, rounding control, and exception handling.

The standard defines three special values, NaN, (not a number), +infinity, and −infinity. These values are returned on overflow conditions. A general principle is that operations that have a value in the limit return an appropriate infinity while those that have no limiting value return NaN, but see the standard for details. For purposes of comparison, infinite values act like a number of the correct sign but with a very large magnitude when compared with finite values. NaN is 'unordered' for comparisons (see clt, clt.un).

While the IEEE 754 specification also allows for exceptions to be thrown under unusual conditions (overflow, invalid operand, . . . ), the EE does not generate these exceptions. Instead, the EE uses the NaN return values and provides the instruction ckfinite to allow users to generate an exception if a result is NaN, +infinity, or −infinity. The rounding mode defined in IEEE 754 is set by the EE to round to the nearest number.

Supported Data Types: IL Instructions and Numeric Types

Most IL instructions that deal with numbers take their inputs from the evaluation stack, and these inputs have an associated type that is known to the JIT compiler. As a result, a single operation like add can have inputs of any numeric data type, although not all instructions can deal with all combinations of operand types. Binary operations other than addition and subtraction require that both operands must be of the same type. Addition and subtraction allow an integer to be added to or subtracted from a managed pointer (types & and *).

Instructions fall into the following categories: numeric, integer, floating point, specific, unsigned/unordered, and load constant instructions. Numeric instructions deal with both integers and floating point numbers, do not treat short integers in any special way, and consider integers to be signed. Simple arithmetic, conditional branch, and comparison instructions fit in this category. Integer instructions deal only with integers, but do not treat short integers in any special way. Bit operations and unsigned integer division/remainder fit in this category. Floating point instructions deal only with floating point numbers. Specific instructions deal with integer and/or floating point numbers, but have variants that deal specially with different sizes and unsigned integers. Integer operations with overflow detection, data conversion instructions, and operations that transfer data between the evaluation stack and other parts of memory fit into this category. Unsigned/unordered instructions are special comparison and branch instructions that treat integers as unsigned and consider unordered floating point numbers specially (as in "branch if greater than or unordered"). The load constant (ldc.*) instructions can be used to load constants of type I4, I8, or R. Natural size constants (type I) must be created by conversion from I4 (conversion from I8 would not be portable) using conv.i or conv.u.

The table of FIG. 25 shows the IL instructions that deal with numeric values, along with the category to which they belong. Instructions that end in ".*" indicate all variants of the instruction (based on size of data and whether the data is treated as signed or unsigned).

Supported Data Types: IL Instructions and Pointer Types

The Execution Engine has the ability to track pointers to objects and collect objects that are not longer reachable (memory management by "garbage collection"). This process copies objects to compact the working set and thus must modify all pointers to objects as they move. For this to work correctly, pointers to objects must only be used in certain ways. The O (object reference) and & (managed pointer) datatypes are the formalization of these restrictions.

The use of object references is tightly restricted in the IL. A few of the base instructions of the IL can handle object references. In particular, they can be:

Loaded/stored onto the stack to be passed as arguments to methods (ldloc, ldarg, stloc, starg)

Duplicated or popped off the stack (dup, pop)

Tested for equality with one another, but not other data types (beq, beq.s, bne, bne.s, ceq)

Loaded/stored into unmanaged memory, in type unsafe code only (ldind.ref, stind.ref)

Create a null reference (ldnull)

Returned as a value (ret)

Managed pointers have several additional base operations.

Addition and subtraction of integers, in units of bytes, returning a managed pointer (add, add.ovf.u, sub, sub.ovf.u)

Subtraction of two managed pointers, returning the number of bytes between them (sub, sub.ovf.u)

Unsigned comparison and conditional branches based on two managed pointers (bge.un, bge.un.s, bgt.un, bgt.un.s, ble.un, ble.un.s, blt.un, blt.un.s, cgt.un, clt.un)

Supported Data Types: Aggregate Data

The EE supports aggregate data, that is, data items that have sub-components (arrays, structures, or instances) but are passed by copying the value. The sub-components can include references to managed memory. Aggregate data is representing using a value class, which can be instantiated in two different ways:

Boxed: as an Object, carrying full type information at runtime, and typically allocated on the heap by the COM+ runtime memory manager.

Unboxed: as a "value class instance" which does not carry type information at runtime and which is never allocated directly on the heap. It can be part of a larger structure on the heap—a field of a boxed class instance or an element of an array. Or it can be on the stack as an argument or local variable. Or it can be allocated as a static variable or static member of a class.

Because value class instances are copied on method call, they do not have "identity" in the sense that Objects (boxed instances of classes) have; see the VOS specification.

Supported Data Types: Aggregate Data: Homes for Values

The home of a data value is where it is stored for possible reuse. The EE directly supports the following home locations:
1. An incoming argument
2. A local variable of a method
3. A field of an object instance
4. A static field associated with a class, interface, or module
5. An array element For each home location, there is a manner to compute (at runtime) the address of the home location and a manner to determine (at JIT compile time) the type of a home location. These are summarized in the table of FIG. 26. In addition to homes, built-in values can exist in two additional ways (i.e. without homes):
1. as constant values (typically embedded in the IL instruction stream using ldc.* instructions)
2. as an intermediate value on the evaluation stack, when returned by a method or IL instruction.

Supported Data Types: Aggregate Data: Opaque Classes

Some languages provide multi-byte data structures whose contents are manipulated directly by address arithmetic and indirection operations. To support this feature, COM+ allows value classes to be created with a specified size but no information about their data members. Instances of these "opaque classes" are handled in precisely the same way as instances of any other class, but the ldfld and stfld instructions cannot be used to access their contents.

Executable Image Information

The execution engine accesses metadata that is stored in a PE file, which is a portable executable file such as a .dll file or a .exe file, as known within the art. Specifically, the EE relies on the following information about each method defined in a PE file:

The instructions composing the method body, including all exception handlers.

The signature of the method, which specifies the return type and the number, order, parameter passing convention, and primitive data type of each of the arguments. It also specifies the native calling convention (this does not affect the IL virtual calling convention, just the native code).

The exception handling array. This array holds information delineating the ranges over which exceptions are filtered and caught.

The maximum operation stack (also called the evaluation stack) depth.

A "zero init flag" that indicates whether the local variables and memory pool should be initialized by the EE (see also localloc).

Type of each local variable in the form of a signature of the local variable array (called the "locals signature").

In addition, the file format is capable of indicating the degree of portability of the file.

There are two kinds of restrictions that can be described:

Restriction to a specific (32-bit or 64-bit) natural size for integers.

Restriction to a specific "endian-ness" (i.e. whether bytes are stored left-to-right or right-to-left within a machine word).

By stating what restrictions are placed on executing the code, the EE class loader can prevent non-portable code from running on an architecture that it cannot support.

Control Flow

The IL instruction set provides a set of instructions to alter the normal flow of control from one IL instruction to the next.

Conditional and Unconditional Branch instructions for use within a method, provided the transfer doesn't cross a protected region boundary.

Method call instructions to compute new arguments, transfer them and control to a known or computed destination method.

Tail call prefix to indicate that a method should relinquish its stack frame before executing a method call.

Return from a method, returning a value if necessary.

Method jump instructions to transfer the current method's arguments to a known or computed destination method.

Exception-related instructions. These include instructions to initiate an exception, transfer control out of a protected region, and end a filter, catch clause, or finally clause.

While the EE supports arbitrary control transfers within a method, there are several restrictions that should be observed, and which are tested by the verifier:

Control transfer is never permitted to enter a catch handler or finally clause except through the exception handling mechanism.

Control transfer out of a protected region is only permitted through an exception instruction (leave, end.filter, end.catch, or end.finally).

The evaluation stack must be empty after the return value is popped by a ret instruction.

All slots on the stack must have the same data type at every point within the method body, regardless of the control flow that allows execution to arrive there.

Control is not permitted to simply "fall through" the end of a method. All paths must terminate with one of these instructions: ret, throw, jmp, jmpi, or tailcall followed by call, calli, or callvirt.

Method Calls

An important design goal of the EE is to abstract method frame layout, including calling convention. That is, instructions emitted by the IL code generator contain sufficient information for different implementations of the EE to use different native calling convention.

Method Calls: Call Site Descriptors

To support this flexibility, call sites need additional information that enables an interpreter or JIT compiler to synthesize any native calling convention. All IL calling instructions (call, calli, and callvirt) include as part of the instruction a description of the call site. This description can take one of two forms. The simpler form, used with the calli instruction, is a "call site description" that provides:

The number of arguments being passed.

The primitive data type of each argument.

The order in which they have been placed on the call stack.

The native calling convention to be used

The more complicated form, used for the call and callvirt instructions, is a "method reference" that augments the call site description with an identifier for the target of the call instruction.

Method Calls: Calling Instructions

The IL has three call instructions that are used to transfer new argument values to a destination method. Under normal circumstances, the called method will terminate and return control to the calling method.

call is designed to be used when the destination address is fixed at the time the IL is linked. In this case, a method reference is placed directly in the instruction. This is comparable to a direct call to a static function in C. It can be used to call static or instance methods or the (statically known) superclass method within an instance method body.

calli is designed for use when the destination address is calculated at run time. A method pointer is passed on the stack and the instruction contains only the call site description.

callvirt, part of the IL VOS instruction set, uses the class of an object (known only at runtime) to determine the method to be called. The instruction includes a method reference, but the particular method isn't computed until the call actually occurs. This allows an instance of a subclass to be supplied and the method appropriate for that subclass to be invoked. The calivirt instruction is used both for instance methods and methods on interfaces.

In addition, each of these instructions can be immediately preceded by a tailcall instruction. This specifies that the calling method terminates with this method call (and returns whatever value is returned by the called method). The tailcall instructs the JIT compiler to discard the calling stack frame prior to making the call (if the call is from untrusted code to trusted code the frame cannot be fully discarded for security reasons). When the called method executes a ret instruction, control returns not to the calling method but rather to wherever that method would itself have returned. Notice that the tailcall instruction shortens the lifetime of the caller's frame so it is incorrect to pass managed pointers (type &) as arguments.

Finally, there are two instructions that indicate an optimization of the tailcall case:

jmp is followed by a methodref token and indicates that the current method's stack frame should be discarded, its arguments should be transferred intact to the destination method, and control should be transferred to the destination. The signature of the calling method must exactly match the signature of the destination method.

jmpi takes a computed destination address on the stack, pops it off the stack, discards the current stack frame, transfers the current arguments to the destination method, and transfers control to the destination method. The signature of the calling method must exactly match the signature of the destination method.

Method Calls: Computed Destinations

The destination of a method call can be either encoded directly in the IL instruction stream (the call and jmp instructions) or computed (the callvirt, calli, and jmpi instructions). The destination address for a callvirt instruction is automatically computed by the Execution Engine based on the method token and the value of the first argument (the this pointer). The method token must refer to a virtual method on a class that is a direct ancestor of the class of the first argument. The EE computes the correct destination by, effectively, locating the nearest ancestor of the first argument's class that supplies an implementation of the desired method (the implementation can be assumed to be more efficient than the linear search implied here).

For the calli and jmpi instructions the IL code is responsible for computing a destination address and pushing it on the stack. This is typically done through the use of a ldfln or ldvirtfn instruction at some earlier time. The ldftn instruction includes a metadata token in the IL stream that specifies a method, and the instruction pushes the address of that method. The ldvirtfn instruction takes a metadata token for a virtual method in the IL stream and an object on the stack. It performs the same computation described above for the callvirt instruction but pushes the resulting destination on the stack rather than calling the method.

The calli instruction includes a call site description that includes information about the native calling convention that should be used to invoke the method. The EE does not check that this correctly matches the calling convention for the method that is being called; any mismatch will result in unpredictable behavior. The jmpi instruction requires that the destination method have the same calling convention and the method that contains the jmpi instruction; any mismatch will result in unpredictable behavior.

Method Calls: Virtual Calling Convention

The IL provides a "virtual calling convention" that is converted by the JIT into a native calling convention. The JIT determines the optimal native calling convention for the target architecture. This allows the native calling convention to differ from machine to machine, including details of register usage, local variable homes, copying conventions for large call-by-value objects (as well as deciding, based on the target machine, what is considered "large"). This also allows the JIT to reorder the values placed on the IL virtual stack to match the location and order of arguments passed in the native calling convention.

The EE uses a single uniform calling convention for all method calls. It is the responsibility of the JITters to convert this into the appropriate native calling convention.

The virtual calling convention is:

If the method being called is an instance method (class or interface) or a virtual method, first push the this pointer. For methods on Objects (including boxed value classes), the this pointer is of type O (object reference). For methods on value classes, the this pointer is provided as a by-ref parameter; that is, the value is a pointer (managed, &, or unmanaged, * or I) to the instance.

If the return value from the method is a value class, a home (a managed or unmanaged pointer) for the value is pushed next. The home must be supplied even if the caller will discard the value. The method's signature will have a specially marked parameter that corresponds to this argument.

Push the remaining arguments in left-to-right order (that is, push the leftmost argument first). Execute the appropriate call instruction (call, calli, or callvirt any of which may be preceded by tailcall).

Method Calls: Parameter Passing

The EE supports three kinds of parameter passing, all indicated in metadata as part of the signature of the method. Each parameter to a method has its own passing convention (e.g., the first parameter may be passed by-value while all others are passed by-ref).

Parameter may be passed as follows:

By-value parameters, where the <u>value</u> of an object is passed from the caller to the callee.

By-ref parameters, where the <u>address</u> of the data is passed from the caller to the callee, and the type of the parameter is therefore a managed or unmanaged pointer.

Ref-any parameters, where a runtime representation of the data type is passed along with the address of the data, and the type of the parameter is therefore one specially supplied for this purpose.

The verifier checks that the types of parameters match the types of values passed, but is otherwise unaware of the details of the calling convention.

For primitive types (integers, floats, etc.) the caller copies the value onto the stack before the call. For Objects the object reference (type O) is pushed on the stack. For managed pointers (type &) or unmanaged pointers (type U), the address is passed from the caller to the callee. This allows the JITter to determine when the copy is made: by the caller, by the callee as part of the method prolog, or immediately prior to any mutation operations.

By-Ref Parameters are the equivalent of C++ reference parameters or PASCAL var parameters: instead of passing as an argument the value of a variable, field, or array element, its address is passed instead; and any assignment to the corresponding parameter actually modifies the corresponding variable, field, or array element. Much of this work is done by the higher-level language, which hides from the user the need to compute addresses to pass a value and the use indirection to reference or update values.

Passing a value by reference requires that the value have a home and it is the address of this home that is passed. Constants and intermediate values cannot be passed as by-ref parameters because they have no home.

Some addresses (e.g., local variables and arguments) have lifetimes tied to the method contexts. These cannot be correctly referenced outside their lifetimes, and so they should not be stored in locations that last beyond their own lifetime. The IL does not (and cannot) enforce this restriction, so the IL generator must enforce this restriction or the resulting IL will not work correctly. For code to be verifiable by-ref parameters may only be passed to other methods or referenced via the appropriate stind or ldind instructions.

By-ref parameters and value classes are sufficient to support statically typed languages (JAVA, C++, PASCAL, etc.). They also support dynamically typed languages that pay a performance penalty to box value classes before passing them to polymorphic methods (LISP, SCHEME, SMALLTALK, etc.). Unfortunately, they are not sufficient to support languages like VISUAL BASIC that require byreference passing of unboxed data to methods that are not statically restricted as to the type of data they accept. These languages require a way of passing both the address of the home of the data and the static type of the home. This is exactly the information that would be provided if the data were boxed, but without the heap allocation required of a box operation.

Ref-Any parameters address this requirement. A ref-any parameter is very similar to a standard by-ref parameter but the static data type is passed as well as the address of the data. Like by-ref parameters, the argument corresponding to a ref-any parameter must have a home. If it were not for the fact that the verifier and the memory manager must be aware of the data type and the corresponding address, a by-ref parameter could be implemented as a standard value class with two fields: the address of the data and the type of the data. Like a regular by-ref parameter, a ref-any parameter can refer to a home that is on the stack, and that home will have a lifetime limited by the call stack. Thus, the IL generator must appropriate-checks on the lifetime of by-ref parameters; and the verifier imposes the same restrictions on the use of ref-any parameters as it does on by-ref parameters.

A ref-any parameter is passed either by creating a new ref-any using the mkrefany instruction or copying an existing one using ldrefany. Given a ref-any argument, the address to which it can be refers can be loaded using the ldanyaddr instruction (which also tests that the type matches the desired type), and the value can then be extracted or modified using the ldind.* or stind.* instructions. The type associated with the ref-any parameter can be extracted using the ldanytype instruction.

A given parameter can be passed using any one of the parameter passing conventions: by-value, by-ref, or ref-any. No combination of these is allowed for a single. parameter, although a method may have different parameters with different calling mechanisms.

There are a pair of non-obvious facts about the parameter passing convention:
A parameter that has been passed in as ref-any cannot be passed on as by-ref or by-value without a runtime type check and (in the case of by-value) a copy.
A by-ref parameter can be passed on as a ref-any by attaching the static type.

The table of FIG. 27 illustrates the parameter passing convention used for each data type.

Exception Handling

The EE supports an exception handling model based on the concept of exceptions object and "protected blocks" of code. When an exception occurs, an object is created to represent the exception. All exceptions objects are boxed instances of some subclass of Microsoft.Runtime.Exception. Users can create their own exception classes by subclassing Microsoft.Runtime.Exception.

There are three kinds of protected blocks:
A finally clause which must be executed whenever the block exits, regardless of whether that occurs by normal control flow or by an unhandled exception.
A type-filtered handler which handles any exception that is of a specified class or any of its sub-classes.
A user filtered handler which runs a user-specified set of IL instructions to determine whether the exception should be ignored (i.e. execution should resume), handled by the associated handler, or passed on to the next protected block.

EE instructions can throw the following exceptions as part of executing individual instructions. The documentation on a particular instruction will list all the exceptions the instruction can throw (except for the general purpose ExecutionEngineException described below that can be generated by all instructions). The list of exceptions in one embodiment is:

Base Instructions
ArithmeticException
DivideByZeroException
ExecutionEngineException
InvalidAddressException
SecurityException
StackOverflowException Object Model Instructions
ClassloadExccption
IndexOutOfRangeException
InvalidAddressException
InvalidCastException
MissingFieldException
MissingMethodException
NullReferenceException
OutOfMemoryException
SecurityException
StackOverflowException
SynchronizationLockException The ExecutionEngineException is special. It can be thrown by any instruction and indicates an unexpected inconsistency in the EE. In one embodiment, code that has been passed through the code verifier should never throw this exception (it is a defect in either the verifier or the EE if it does), unless it is thrown explicitly by the code sequence. However, unverified code can cause this error if the code is corrupt or inconsistent in some way.

Note that, because of the verifier, there are no exceptions for things like 'MetaDataTokenNotFound.' The verifier can detect this inconsistency before the instruction is ever executed (the code is then considered unverified). If the code has not been verified, this type of inconsistency would raise the generic ExecutionEngineException.

Exceptions can also be thrown by the COM+ Runtime, as well as by user code, using the throw instruction. The handing of an exception is identical, regardless of the source.

Each method in an executable has associated with it a (possibly empty) array of exception handling information. Each entry in the array describes a protected block, its filter, and its handler (which may be either a catch handler or a finally handler). When an exception occurs, the EE is searches the array for the first protected block that Protects a region including the current instruction pointer and Is a catch handler block and Whose filter wishes to handle the exception If a match is not found in the current method, the calling method is searched, and so on. If no match is found the EE will dump a stack trace and abort the program. If a match is found, the EE walks the stack back to the point just located, but this time calling the finally handlers. It then starts the corresponding exception handler. Stack frames are discarded either as this second walk occurs or after the handler completes, depending on information in the exception handler array entry associated with the handling block.

Some things to notice are:

The ordering of the exception clauses is important. If handlers are nested, the most deeply nested try blocks must come before the try blocks that enclose them.

Exception handlers can access the local variables and the local memory pool of the routine that catches the exception, but any intermediate results on the operand stack at the time the exception was thrown are lost.

Execution cannot be resumed at the location of the exception. This restriction may be relaxed in the future.

Furthermore, the IL has special instructions to:

Throw a user-defined exception.

Leave a protected block and execute the appropriate finally clauses within a method, without throwing an exception.

End a user-supplied filter clause and return a value indicating whether to handle the exception End a catch handler and return to normal processing (possibly unwinding the stack)

End a finally clause and continue crawling the stack

It is not legal to enter a user-supplied filter, catch handler, or finally handler other than through the exception mechanism. It is also not legal to exit a protected region with any control transfer instruction other than a leave.

OptIL: An Instruction Set Within IL

A fundamental issue associated with generating intermediate IL is how much of the work is done by the IL generator and how much of the work is done by the Execution Engine (via a JIT compiler). The IL instruction set was designed to be easy for compilers to generate so that IL can be generated quickly in rapid application development (RAD) environments, where compile speed and ease of debugging are at a premium.

On the other hand, in situations where load time is important, it is useful to do as much work as possible in the code generator, before the executable is loaded. In particular it is useful to do expensive optimizations like common sub-expression elimination, constant folding, loop restructuring, and even register allocation in the code generator (as would be done in a traditional compiler). The instruction set should be able to represent such optimized code as well.

Finally, in some environments it is important that the JITter be small and run in a nearly constant amount of memory, even for large methods. The instruction set should allow a compiler to compute information and pass it on to the JITter that will reduce the memory required by the JITter (e.g., register allocation and branch targets).

In the COM+ Runtime environment, an optimizing compiler can best express many optimizations by generating OptIL. OptIL is optimized code represented using the same IL instruction set; however, OptIL differs from non-OptIL code in the following ways Many transformations will have been done (e.g., loop restructuring, constant folding, CSE).

The code will obey certain conventions (e.g., method calls are not nested).

There will be additional annotations (e.g., exactly when each variable is used for the last time).

Note that an OptIL program is still a valid IL program (it can be run by the normal EE), but because it has been optimized by the code generator it can be compiled to native code very quickly and using little memory.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for verifying an intermediate language code body having associated therewith metadata of the intermediate language code body, the method comprising:

verifying the metadata of the intermediate language code body for consistency and accuracy prior to commencement of translation of the intermediate language code body into executable code;

verifying the intermediate language code body for consistency and accuracy prior to commencement of translation of the intermediate language code body into executable code;

translating the intermediate language code body into executable code; and executing the executable code.

2. The method of claim 1, further comprising initially generating the intermediate language code body by compiling a course code into the intermediate language code body.

3. The method of claim 1, wherein verifying the intermediate language code body for consistency and accuracy comprises checking value classes of the intermediate language code body.

4. The method of claim 1, wherein verifying the intermediate language code body for consistency and accuracy comprises native-size primitive types of the intermediate language code body.

5. The method of claim 1, wherein verifying the intermediate language code body for consistency and accuracy comprises verifying tail calls of the intermediate language code body.

6. A computer-readable medium having processor instructions stored thereon for execution by a processor to perform a method comprising:
  verifying metadata of an intermediate language code body for consistency and accuracy;
  verifying the intermediate language code body for consistency and accuracy;
  translating the intermediate language code body into executable code; and
  executing the executable code.

7. The medium of claim 6, further comprising initially generating the intermediate language code body by compiling a source code body into the intermediate language code body.

8. The medium of claim 6, wherein verifying the intermediate language code body for consistency and accuracy comprises checking value classes of the intermediate language code body.

9. The medium of claim 6, wherein verifying the intermediate language code body for consistency and accuracy comprises checking native-size primitive types of the intermediate language body code.

10. The medium of claim 6, wherein verifying the intermediate language code body for consistency and accuracy comprises verifying tail calls of the intermediate language code body.

11. A computerized system, comprising:
  an executive engine to translate an intermediate language code body to an executable code body based thereon for execution; and
  a verifier, part of the execution engine, to verify the intermediate language code body and metadata of the intermediate language code body prior to translation thereof to the executable code body.

12. The system of claim 11, wherein at least one of the execution engine and the verifier comprises a computer program executed by a processor from a computer-readable medium.

13. A computerized device comprising:
  a processor;
  a computer-readable medium;
  an intermediate language code body stored as data on the computer-readable medium;
  an executable bode body based on the intermediate language code body and stored as data on the computer-readable medium;
  an execution engine executed by the processor from the compute-readable medium to translate the intermediate language code body to the executable code body for execution; and
  a verifier, part of the execution engine, to verify the intermediate language code body and metadata of the intermediate language code body prior to translation thereof to the executable code body.

14. A computerized system comprising:
  a first component of an intermediate language code body verifier to perform semantic checks on an intermediate language code body, including verifying that branch destinations within the intermediate language code body are proper;
  a second component of the intermediate language code body verifier to perform semantic checks on the intermediate language code; and
  wherein at least one of the first component and the second component is executed by a processor from a computer-readable medium.

15. The system of claim 14, wherein the first component further is to determine a location of each plurality of basic blocks within the intermediate language code body.

16. The system of claim 15, wherein the first component further is to prepare a sorted list of the location of each of the plurality of basic blocks.

17. The system of claim 14, wherein for each of a plurality of opcodes within the intermediate language code body, the second component further is to perform a corresponding list of operations and checks.

18. The system of claim 14, wherein a type of an argument to a method for the intermediate language code body is fixed.

19. The system of claim 14, wherein a type of a primitive local variable of the intermediate language code body is fixed.

20. The system of claim 19, wherein the type of the primitive local variables comprises one of an integer and floating point.

* * * * *